United States Patent
Mattam et al.

(10) Patent No.: US 12,219,652 B2
(45) Date of Patent: Feb. 4, 2025

(54) METHOD AND APPARATUS FOR CONTROLLING SECONDARY CELL GROUP IN A MULTI-RAT DUAL CONNECTIVITY NETWORK

(71) Applicant: Samsung Electronics Co., Ltd., Suwon-si (KR)

(72) Inventors: Jajohn Mathew Mattam, Bangalore (IN); Vinay Kumar Shrivastava, Bangalore (IN); Anshuman Nigam, Bangalore (IN); Arijit Sen, Bangalore (IN); Fasil Abdul Latheef, Bangalore (IN); Neha Sharma, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 623 days.

(21) Appl. No.: 17/514,749

(22) Filed: Oct. 29, 2021

(65) Prior Publication Data

US 2022/0132625 A1 Apr. 28, 2022

Related U.S. Application Data

(63) Continuation of application No. PCT/KR2021/014933, filed on Oct. 22, 2021.

(30) Foreign Application Priority Data

| Oct. 22, 2020 | (IN) | 202041046102 |
| Sep. 27, 2021 | (IN) | 2020 41046102 |
| Sep. 28, 2021 | (IN) | 202142043978 |

(51) Int. Cl.
| *H04W 76/38* | (2018.01) |
| *H04W 76/19* | (2018.01) |
| *H04W 76/28* | (2018.01) |

(52) U.S. Cl.
CPC .......... *H04W 76/38* (2018.02); *H04W 76/19* (2018.02); *H04W 76/28* (2018.02)

(58) Field of Classification Search
CPC ..... H04W 76/38; H04W 76/19; H04W 76/28; H04W 76/16; H04W 76/27; H04W 88/06; Y02D 30/70
See application file for complete search history.

(56) References Cited

U.S. PATENT DOCUMENTS

| 10,511,981 B2 | 12/2019 | Lee et al. |
| 11,310,852 B2 | 4/2022 | Hayashi |

(Continued)

FOREIGN PATENT DOCUMENTS

| EP | 3 866 557 A1 | 8/2021 |
| KR | 10-2101517 B1 | 4/2020 |

(Continued)

OTHER PUBLICATIONS

LG Electronics Inc, DataInactivityTimer in NR, R2-1815188, 3GPP TSG-RAN WG2 Meeting #103bis, Chengdu, China, Sep. 28, 2018.

(Continued)

*Primary Examiner* — Habte Mered
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The disclosure relates to a method and an apparatus to trigger deactivation and re-activation of a secondary cell (Continued)

group (SCG) in a multi-radio access Technology (RAT) dual connectivity (MR-DC) network.

20 Claims, 26 Drawing Sheets

(56) References Cited

U.S. PATENT DOCUMENTS

| | | | | |
|---|---|---|---|---|
| 11,546,968 | B2* | 1/2023 | Zhang | H04W 76/15 |
| 2015/0092707 | A1 | 4/2015 | Kwon | |
| 2017/0127473 | A1* | 5/2017 | Virtej | H04W 76/15 |
| 2019/0045564 | A1 | 2/2019 | Hayashi | |
| 2022/0159483 | A1 | 5/2022 | Lee et al. | |
| 2022/0312417 | A1 | 9/2022 | Venkata et al. | |
| 2023/0128847 | A1* | 4/2023 | Purkayastha | H04W 56/0015 370/329 |
| 2023/0276353 | A1* | 8/2023 | Cheng | H04W 60/04 370/329 |
| 2023/0397297 | A1* | 12/2023 | Zhang | H04W 72/231 |

FOREIGN PATENT DOCUMENTS

| | | |
|---|---|---|
| KR | 10-2020-0103234 A | 9/2020 |
| WO | 2020/075721 A1 | 4/2020 |
| WO | 2020/190188 A1 | 9/2020 |

OTHER PUBLICATIONS

Extended European Search Report dated Feb. 29, 2024, issued in European Patent Application No. 21883346.5.
Vivo, Activation of a deactivated SCG, 3GPP TSG-RAN WG2 Meeting #113bis electronic, R2-2102873, Apr. 12-Apr. 20, 2021.
Lenovo, Discussion on SCG activation, 3GPP TSG-RAN WG2 Meeting #113bis-e, R2-2103399, Apr. 12-Apr. 20, 2021.
LG Electronics Inc., Acrivation and Deactivation on SCG, 3GPP TSG-RAN WG2 Meeting #113Bis-e, R2-2103570, Apr. 12-Apr. 20, 2021.
Qualcomm Incorporated, Activation of deactivated SCG, 3GPP TSG-RAN WG2 Meeting #113-bis-e, R2-2103895, Apr. 12-Apr. 20, 2021.
Huawei, SCG activation, 3GPP TSG-RAN WG2 Meeting #113b-e, R2-2103979, Apr. 12-Apr. 20, 2021.
3GPP; TSG RAN; Evolved Universal Terrestrial Radio Access (E-UTRA) and NR; Multi-connectivity; Stage 2 (Release 16), 3GPP TS 37.340 V16.3.0, Oct. 2, 2020.
International Search Report dated Jan. 20, 2022, issued in International Patent Application No. PCT/KR2021/014933.
Indian Office Action dated Mar. 3, 2023, issued in Indian Patent Application No. 202142043978.
Indian Office Action dated Jan. 16, 2023, issued in Indian Patent Application No. 202041046102.

* cited by examiner

METHOD AND APPARATUS FOR CONTROLLING SECONDARY CELL GROUP IN A MULTI-RAT DUAL CONNECTIVITY NETWORK

FIELD OF INVENTION

The disclosure relates to a method and an apparatus to trigger deactivation and re-activation of a secondary cell group (SCG) in a multi-radio access technology (RAT) dual connectivity (MR-DC) network.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In general, there exist use cases and applications that can benefit from a quick setup of dual connectivity on a user equipment (UE). For this reason, it is reasonable that a network operator configures secondary cell group (SCG) to the UE (configured dual connectivity to a UE) as early in a connection as possible (e.g., as soon as connection is setup, or as soon as UE is in coverage of the SCG etc.). It is also possible that the UE no longer needs the dual connectivity for its ongoing services, and may be better served without dual connectivity. One approach is that the UE can be released from dual connectivity, and revert to single connectivity if the SCG is no longer required.

This however increases signaling and latency in configuring SCG later when required. An alternative method is to move the SCG to an intermediate state from which it can be reactivated quickly. This method allows the SCG to be deactivated when it is no longer required, and re-activated when it is preferred to be in dual connectability (DC). The idea relates to trigger conditions that lead to deactivation/activation (reactivation) of the SCG and the radio resource control/medium access control (RRC/MAC) level signaling involved in the process. In the disclosure, the term SCG activation and SCG reactivation has been used interchangeably.

Thus, it is desired to address the above mentioned disadvantages or other shortcomings or at least provide a useful alternative.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method to trigger deactivation and re-activation of SCG in a MR-DC network.

Another aspect of the disclosure is to trigger a SCG deactivation based on a data inactivity timer.

Another aspect of the disclosure is to trigger the SCG deactivation based on a T3xy timer.

Another aspect of the disclosure is to trigger the SCG deactivation based on a C-DRX counter.

Another aspect of the disclosure is to trigger the SCG activation based on a data pending in PDCP greater than a threshold.

Another aspect of the disclosure is to trigger the SCG activation based on a data received in a DL MCG greater than a threshold.

Another aspect of the disclosure is to stop forwarding the data to a SCG leg based on a DL data and UL data.

Additional aspects will be set forth in part in the description which follows and, in part, will be apparent from the description, or may be learned by practice of the presented embodiments.

In accordance with an aspect of the disclosure, a method performed by a user equipment (UE) for controlling a secondary cell group (SCG) in a multi-radio access technology (multi-RAT) dual connectivity (MR-DC) network is provided. The method includes detecting at least one of a data inactivity timer configured for a master cell group (MCG), a UE specific timer, or a connected mode-discontinuous reception (C-DRX) counter, detecting an activation of the SCG, starting at least one of the data inactivity timer configured for the MCG to use for automatic deactivation of the SCG, the UE specific timer to use for automatic deactivation of the SCG, or the C-DRX counter to use for automatic deactivation of the SCG, detecting whether at least one of an expiry of the data inactivity timer configured for the MCG, an expiry of the UE specific timer, or the C-DRX counter is met, and deactivating the SCG in response to detecting at least one of the expiry of the data inactivity timer configured for the MCG, the expiry of the UE specific timer, or the C-DRX counter is met.

In accordance with another aspect of the disclosure, a user equipment (UE) for controlling a secondary cell group (SCG) in a multi-radio access technology (multi-RAT) dual connectivity (MR-DC) network is provided. The UE includes a transceiver and a controller. The controller is coupled with the transceiver and configured to detect at least one of a data inactivity timer configured for a master cell group (MCG), a UE specific timer, or a connected mode-discontinuous reception (C-DRX) counter, detect an activation of the SCG, start at least one of the data inactivity timer configured for the MCG to use for automatic deactivation of the SCG, the UE specific timer to use for automatic deactivation of the SCG, or the C-DRX counter to use for automatic deactivation of the SCG, detect whether at least one of an expiry of the data inactivity timer configured for the MCG, an expiry of the UE specific timer, or the C-DRX counter is met, and deactivate the SCG in response to detecting at least one of the expiry of the data inactivity timer configured for the MCG, the expiry of the UE specific timer, or the C-DRX counter is met.

In accordance with another aspect of the disclosure, a method for controlling of a SCG in a MR-DC network is provided. The method includes creating, by the network node, an SCG deactivation criteria including at least one of a data inactivity timer, a T3xy timer, and a connected mode-discontinuous reception (C-DRX) counter to deactivate the SCG for the UE. Further, the method includes sending, by the network node, a radio resource control (RRC) message including the SCG deactivation criteria to the UE to trigger deactivation of the SCG.

In an embodiment, the RRC message includes one of an RRC configuration message and an RRC reconfiguration message.

In an embodiment, the method further includes receiving, by the network node, a notification from the UE informing about the deactivation of the SCG by the UE, where receiving, by the network node, the notification from the UE comprises one of receiving, by the network node, at least one of UE assistance information message, a new information element (IE) in an existing RRC message and a new RRC message from the UE to indicate about the deactivation of the SCG by the UE, and receiving, by the network node, a medium access control (MAC) control element (MAC CE) from the UE to indicate about the deactivation of the SCG by the UE. The MAC CE includes a SCG Deactivation-Reactivation field indicating MAC CE is triggered for UE deactivation of the SCG by the UE and/or at least one reserved bit field.

In an embodiment, the MAC CE includes an SCG deactivation/activation (D/A) field indicating the deactivation of SCG by the UE.

In an embodiment, the method includes indicating by the UE a preference for deactivation or release of SCG to the network node. Accordingly, the network node may perform either deactivation of SCG or release of the SCG.

In an embodiment, a UE capable of providing an indication for its preference for SCG deactivation or SCG release may initiate the procedure upon being configured by the network to provide the indication in several cases e.g., when meeting deactivation criteria, SCG deactivation based on timers and data inactivity. The network utilizes "Otherconfig" to configure the UE to send a UE assistance information message for the SCG deactivation/release and/or activation. This may also include a prohibit timer to control the frequent transmission of the UE assistance information message.

In an embodiment, if the UE is configured to provide its preference for one of SCG deactivation and SCG release, and if at least one of the UE did not transmit a UE assistance information message since it was configured to provide preference and the UE did not transmit a UE assistance information message since it was previously at least one of deactivated and activated, the UE initiates transmission of the UE assistance information message to provide its preference for one of SCG deactivation and SCG release.

In an embodiment, the UE assistance information message includes the field for "SCG deactivation or activation" and/or a preference for "SCG deactivation or SCG release". The UE will set the field "SCG deactivation or activation" for deactivation for the purpose of SCG deactivation and/or set "SCG deactivation or SCG release" as needed for deactivation or release.

In an embodiment, the method further includes receiving, by the network node, an indication from the UE to indicate that the SCG deactivation criteria to deactivate the SCG is met at the UE. Further, the method includes deactivating, by the network node, the SCG in response to receiving the indication from the UE. Further, the method includes sending, by the network node, a command to the UE informing about the deactivation of the SCG by the network node.

In an embodiment, deactivating, by the network node, the SCG includes sending to the UE one of RRC reconfiguration and a new information element (IE) in an existing RRC message e.g., RRC Resume message including an RRC reconfiguration. The RRC reconfiguration can include an SCG state indicating deactivation for SCG. Deactivation can be indicated by either presence or absence of an SCG state field in the RRC reconfiguration message. The RRC reconfiguration message can be transmitted over a signaling radio bearer (e.g., SIB1).

In an embodiment, deactivating, by the network node, the SCG in response to receiving the indication from the UE includes receiving, by the network node, an indication from an RRC entity of the network node for deactivation of the SCG by the network node in response to receiving the indication from the UE, identifying, by the RRC entity of the network node, the SCG corresponding to the SCG deactivation criteria, and deactivating, by the RRC entity of the network node, the SCG without releasing an RRC connection between the UE and the network node.

In an embodiment, the method includes receiving, by the network node, a request to reactivate the deactivated SCG from the UE. Further the method includes reactivating, by the network node, the deactivated SCG. Further the method includes sending, by the network node, a command to the UE to indicate about the reactivation of the deactivated SCG by the network node.

In an embodiment, activating (or reactivating), by the network node, the SCG includes sending to the UE one of RRC reconfiguration and a new information element (IE) in an existing RRC message e.g., RRC Resume message including an RRC reconfiguration. RRC reconfiguration can include SCG state indicating activation (or reactivation) for SCG. The activation (or reactivation) can be indicated by either presence or absence of SCG state field in RRC reconfiguration message. The RRC reconfiguration message can be transmitted over signaling radio bearer e.g., SIB1.

In an embodiment, receiving, by the network node, the request to reactivate the deactivated SCG from the UE comprises one of receiving, by the network node, at least one of a UE assistance information message, a new IE in an existing RRC message and a new RRC message from the UE to reactivate of the SCG by the network node, and receiving, by the network node, a MAC CE from the UE to reactivate the SCG by the network node, wherein the MAC CE includes a SCG Deactivation-Reactivation field indicating MAC CE is triggered for reactivation of the SCG by the network node and/or at least one reserved bit field.

In an embodiment, the UE capable of providing an indication for its preference for SCG activation or reactivation may initiate the procedure upon being configured by the network to provide the indication in several cases e.g., when meeting activation criteria, the SCG activation based on a data pending in PDCP greater than a threshold, SCG activation based on a data received in a DL MCG greater than a threshold. The network utilizes "Otherconfig" to configure the UE to send UE assistance information message for SCG deactivation/release and/or activation. This may also include a prohibit timer to control the frequent transmission of the UE assistance information message.

In an embodiment, if the UE is configured to provide its preference for SCG activation, and if at least one of the UE did not transmit a UE assistance information message since it was configured to provide preference and the UE did not transmit a UE assistance information message since it was previously deactivated, the UE initiates transmission of the UE assistance information message to provide its preference for SCG activation.

In an embodiment, the UE assistance information message includes the field for "SCG deactivation or activation" and/or a preference for "SCG deactivation or SCG release". The UE will only use and set the field "SCG deactivation or activation" for activation for the purpose of SCG activation or reactivation.

In accordance with another aspect of the disclosure, a method for controlling a SCG in a MR-DC network is provided. The method includes receiving, by a UE, an SCG deactivation criteria from a network node including at least one of a data inactivity timer, a T3xy timer, or a C-DRX counter to deactivate the SCG, wherein the UE is in a connected state. Further, the method includes detecting, by the UE, whether the SCG deactivation criteria is met. Further, the method includes performing, by the UE, at least one of deactivating the SCG in response to detecting that the SCG deactivation criteria is met at the UE, deactivating the SCG in response to detecting that the SCG deactivation criteria is met at the UE, and sending a notification to the network node informing about the deactivation of the SCG by the UE, or sending an indication from the UE to indicate that the SCG deactivation criteria to deactivate the SCG is met at the UE, and receiving a command to deactivate the SCG from the network node.

In an embodiment, detecting, by the UE, whether the SCG deactivation criteria is met includes determining, by the UE, that at least one of the data inactivity timer and the T3xy timer is configured for deactivation of the SCG, starting, by the UE, at least one of the data inactivity timer and the T3xy timer, monitoring, by the UE, whether there is a data activity at the UE until expiry of at least one of the data inactivity timer and the T3xy timer, and detecting, by the UE, that the SCG deactivation criteria is met in response to determining that there is no data activity at the UE until expiry of at least one of the data inactivity timer and the T3xy timer.

In an embodiment, the method includes restarting, by the UE, at least one of the data inactivity timer and the T3xy timer in response to determining that there is data activity at the UE before expiry of at least one of the data inactivity timer and the T3xy timer. Further, the method includes monitoring, by the UE, whether there is a data activity at the UE until expiry of at least one of the restarted data inactivity timer and the restarted T3xy timer. Further, the method includes detecting, by the UE, that the SCG deactivation criteria is met in response to determining that there is no data activity at the UE until expiry of at least one of the restarted data inactivity timer and the restarted T3xy timer based on the monitoring.

In an embodiment, detecting, by the UE, whether the SCG deactivation criteria is met includes detecting, by the UE, that the C-DRX counter is configured for deactivation of the SCG, monitoring, by the UE, C-DRX cycles for data transfer at the UE, determining, by the UE, whether no data transfer at the UE for configured number of DRX cycles in the C-DRX counter based on the monitoring, and detecting, by the UE, that the SCG deactivation criteria is met in response to determining that the no data transfer at the UE for the configured number of DRX cycles in the C-DRX counter based on the monitoring.

In an embodiment, deactivating, by the UE, the SCG includes sending, by a MAC entity of the UE, an indication to an RRC entity of the UE for deactivation of the SCG in response to detecting that the SCG deactivation criteria is met, identifying, by the RRC entity of the UE, the SCG corresponding to the SCG deactivation criteria, and deactivating, by the RRC entity of the UE, the SCG without releasing an RRC connection between the UE and the network node.

In an embodiment, sending the notification to the network node informing about the deactivation of the SCG by the UE comprises one of sending, by the UE, at least one of a UE assistance information message, a new IE in an existing RRC message and a new RRC message to the network node to indicate about the deactivation of the SCG by the UE, and sending, by the UE, a MAC CE to the network node to indicate about the deactivation of the SCG by the UE, wherein the MAC CE includes a SCG Deactivation-Reactivation field indicating MAC CE is triggered for UE deactivation of the SCG by the UE and/or at least one reserved bit field.

In an embodiment, the method further includes detecting, by the UE, whether a SCG reactivation criteria is met. Further, the method includes performing, by the UE, one of reactivating the deactivated SCG in response to detecting that the SCG reactivation criteria is met, and sending a notification to the network node to indicate about the reactivation of the SCG by the UE, and sending an indication to the network node to reactivate the deactivated SCG by the network node, and receiving a command from the network node to reactivate the deactivated SCG.

In an embodiment, sending the indication request to the network node to reactivate the deactivated SCG by the network node comprises one of sending, by the UE, at least one of UE assistance information message, a new IE in an existing RRC message and a new RRC message to the network node to reactivate the SCG by the network node, and sending, by the UE, a MAC CE to the network node to reactivate the SCG by the network node, wherein the MAC CE comprises a SCG Deactivation-Reactivation field indicating MAC CE is triggered for reactivation of the SCG by the network node and/or at least one reserved bit field.

In accordance with another aspect of the disclosure, a method for controlling a SCG in a MR-DC network is provided. The method includes detecting, by a network node, whether the SCG deactivation criteria is met when the UE is in a connected state with the SCG, wherein SCG deactivation criteria includes at least one of a data inactivity timer to deactivate the SCG, a T3xy timer to deactivate the SCG, or a C-DRX counter to deactivate the SCG. Further, the method includes deactivating, by the network node, the SCG in response to detecting that the SCG deactivation criteria is met. Further, the method includes sending, by the network node, a command to the UE informing about the deactivation of the SCG by the network node.

In an embodiment, sending, by the network node, the command to the UE to indicate about the deactivation of the SCG by the network node comprises one of sending, by the network node, at least one of an RRC reconfiguration, a new IE in an existing RRC message or a new RRC message to the UE to indicate about the deactivation of the SCG by the network node, or sending, by the network node, a medium access control (MAC) control element (MAC CE) to the UE to indicate about the deactivation of the SCG, wherein the MAC CE includes a SCG Deactivation-Reactivation field indicating MAC CE is triggered for deactivation of the SCG by the network node and/or at least one reserved bit field.

In an embodiment, deactivating, by the network node, the SCG in response to detecting that the SCG deactivation criteria is met includes sending, by a MAC entity of the network node, an indication to an RRC entity of the network node for deactivation of the network node in response to detecting that the SCG deactivation criteria is met, and deactivating, by the RRC entity of the network node, the SCG without releasing an RRC connection between the UE and the network node.

In an embodiment, detecting, by the network node, whether the SCG deactivation criteria is met includes determining, by the network node, that at least one of the data inactivity timer and the T3xy timer is configured for deactivation of the SCG by the network node, starting, by the network node, at least one of the data inactivity timer and the T3xy timer, monitoring, by the network node, whether there is a data activity at the network node until expiry of at least one of the data inactivity timer and the T3xy timer, and detecting, by the network node, that the SCG deactivation criteria is met in response to determining that there is no data activity at the network node until expiry of at least one of the data inactivity timer and the T3xy timer.

In an embodiment, the method includes restarting, by the network node, at least one of the data inactivity timer and the T3xy timer in response to determining that there is data activity at the network node before expiry of at least one of the data inactivity timer and the T3xy timer. Further, the method includes monitoring, by the network node, whether there is a data activity at the network node until expiry of at least one of the restarted data inactivity timer and the restarted T3xy timer. Further, the method includes detecting, by the network node, that the SCG deactivation criteria is met in response to determining that there is no data activity at the network node until expiry of at least one of the restarted data inactivity timer and the restarted T3xy timer based on the monitoring.

In an embodiment, detecting, by the network node, whether the SCG deactivation criteria is met includes detecting, by the network node, that the C-DRX counter is configured for deactivation of the SCG by the network node, monitoring, by the network node, C-DRX cycles for data transfer at the network node, determining, by the network node, whether no data transfer at the network node for configured number of DRX cycles in the C-DRX counter based on the monitoring, and detecting, by the network node, that the SCG deactivation criteria is met in response to determining that the no data transfer at the network node for the configured number of DRX cycles in the C-DRX counter based on the monitoring.

In an embodiment, deactivating, by the network node, the SCG includes sending, by a MAC entity of the network node, an indication to an RRC entity of the network node for deactivation of the SCG by the network node in response to detecting that the SCG deactivation criteria is met at the network node, identifying, by the RRC entity of the network node, the SCG corresponding to the SCG deactivation criteria, and deactivating, by the RRC entity of the network node, the SCG without releasing an RRC connection between the UE and the network node.

In an embodiment, sending the command to the network node informing about the deactivation of the SCG by the network node comprises one of sending, by the network node, at least one of a new IE in an existing RRC message and a new RRC message to the UE to indicate about the deactivation of the SCG by the network node, and sending, by the network node, a MAC CE to the UE to indicate about the deactivation of the SCG by the network node, wherein the MAC CE includes a SCG Deactivation-Reactivation field indicating MAC CE is triggered for UE autonomous deactivation of the SCG by the network node and/or at least one reserved bit field.

In an embodiment, the method includes detecting, by the network node, whether a SCG reactivation criteria is met. Further, the method includes performing, by the network node, one of reactivating the deactivated SCG in response to detecting that the SCG reactivation criteria is met at the network node, and sending an indication to the UE to indicate about the reactivation of the SCG by the network node, and sending a command to the UE to reactivate the deactivated SCG by the network node, and receiving an indication from the UE to indicate about the reactivation of the deactivated SCG by the UE.

In an embodiment, sending the indication to the UE to reactivate the deactivated SCG by the UE comprises one of sending, by the network node, at least one of a new information element (IE) in an existing RRC message and a new RRC message to the UE to reactivate the SCG by the UE, and sending, by the network node, a medium access control (MAC) control element (MAC CE) to the UE to reactivate the SCG by the UE, wherein the MAC CE includes a SCG Deactivation-Reactivation field indicating MAC CE is triggered for reactivation of the SCG by the UE and/or at least one reserved bit field.

In accordance with another aspect of the disclosure, a network node for controlling a SCG in a MR-DC network is provided. The network node includes a memory storing information about the SCG and a SCG deactivation-reactivation controller communicatively connected to the memory and a processor. The SCG deactivation-reactivation controller is configured to detect that a UE is in a connected state with the network node. Further, the SCG deactivation-reactivation controller is configured to create a SCG deactivation criteria comprising at least one of a data inactivity timer to deactivate the SCG, a T3xy timer to deactivate the SCG, and a C-DRX counter to deactivate the SCG. Further, the SCG deactivation-reactivation controller is configured to send an RRC message comprising the SCG deactivation criteria to the UE to trigger deactivation of the SCG.

In accordance with another aspect of the disclosure, a UE for controlling a SCG in a MR-DC network is provided. The UE includes a memory storing information about the SCG and a SCG deactivation-reactivation controller communicatively connected to the memory and a processor. The SCG deactivation-reactivation controller is configured to receive a SCG deactivation criteria from a network node when the UE is in a connected state with the network node. The SCG deactivation criteria includes at least one of a data inactivity timer to deactivate the SCG, a T3xy timer to deactivate the SCG, and a connected mode-discontinuous reception (C-DRX) counter to deactivate the SCG. Further, the SCG deactivation-reactivation controller is configured to detect whether the SCG deactivation criteria is met. Further, the SCG deactivation-reactivation controller is configured to perform one of deactivate the SCG in response to detecting that the SCG deactivation criteria is met at the UE, deactivate the SCG in response to detecting that the SCG deactivation criteria is met at the UE, and send a notification to the network node informing about the deactivation of the SCG by the UE, and send an indication from the UE to indicate that the SCG deactivation criteria to deactivate the SCG is met at the UE, and receive a command informing about the deactivation of the SCG by the network node.

In accordance with another aspect of the disclosure, a network node for controlling a SCG in a MR-DC network is provided. The network node includes a memory storing information about the SCG and a SCG deactivation-reactivation controller communicatively connected to the memory and a processor. The SCG deactivation-reactivation controller is configured to detect whether the SCG deactivation criteria is met when the UE is in a connected state with the SCG. The SCG deactivation criteria includes a data inactivity timer to deactivate the SCG, a T3xy timer to deactivate the SCG, and a C-DRX counter to deactivate the SCG. The SCG deactivation-reactivation controller is configured to deactivate the SCG in response to detecting that the SCG deactivation criteria is met. The SCG deactivation-reactivation controller is configured to send a command to the UE informing about the deactivation of the SCG by the network node.

In accordance with another aspect of the disclosure, a method for controlling a SCG in a MR-DC network is provided. The method includes detecting, by a UE, at least one of a data inactivity timer configured for an MCG, a UE specific timer used for the SCG, or a C-DRX counter derived from the CDRX configuration for the SCG. Further, the method includes detecting, by the UE, an activation of the SCG. Further, the method includes starting, by the UE, at least one of the data inactivity timer configured for the MCG to use for automatic deactivation of the SCG, the UE specific timer used for the SCG to use for automatic deactivation of the SCG, or the C-DRX counter derived from the CDRX configuration for the SCG to use for automatic deactivation of the SCG by the UE. Further, the method includes detecting, by the UE, whether at least one of an expiry of the data inactivity timer configured for the MCG, an expiry of the UE specific timer used for the SCG, or the C-DRX counter derived from the CDRX configuration for the SCG is met. Further, the method includes deactivating, by the UE, the SCG in response to detecting at least one of the expiry of the data inactivity timer configured for the MCG, the expiry of the UE specific timer used for the SCG, or the C-DRX counter derived from the CDRX configuration for the SCG is met.

In an embodiment, further, the method includes restarting, by the UE, at least one of the data inactivity timer and the UE specific timer in response to determining that there is data activity at the UE before expiry of at least one of the data inactivity timer and the UE specific timer. Further, the method includes monitoring, by the UE, whether there is a data activity at the UE until expiry of at least one of the restarted data inactivity timer and the restarted UE specific timer.

In an embodiment, detecting, by the UE, whether the C-DRX counter derived from the CDRX configuration for the SCG is met includes monitoring, by the UE, C-DRX cycles for data transfer at the UE, determining, by the UE, whether no data transfer at the UE for configured number of DRX cycles in the C-DRX counter based on the monitoring, and detecting, by the UE, that the C-DRX counter derived from the CDRX configuration for the SCG is met in response to determining that the no data transfer at the UE for the configured number of DRX cycles in the C-DRX counter based on the monitoring.

In an embodiment, deactivating, by the UE, the SCG includes sending, by a MAC entity of the UE, an indication to an RRC entity of the UE for automatic deactivation of the SCG by the UE, and deactivating, by the RRC entity of the UE, the SCG without releasing an RRC connection between the UE and the network node.

In an embodiment, the method includes detecting, by the UE, at least one of data pending in packet data convergence protocol (PDCP) is greater than a threshold, data received in downlink (DL) from the MCG is greater than a threshold, any data pending to transfer on SCG bearer, and an MCG failure. Further, the method includes reactivating, by the UE, the deactivated SCG.

In accordance with another aspect of the disclosure, a method for controlling a SCG in a MR-DC network is provided. The method includes detecting, by a UE, whether DL data is less than a DL data threshold. Further, the method includes detecting, by the UE, UL data is less than a UL data threshold in response to determining that the DL data is less than the DL data threshold. Further, the method includes preparing, by the UE, early deactivation of the SCG by stop forwarding the DL data and the UL data to the SCG in response to detecting that the UL data is less than the UL data threshold. Further, the method includes deactivating, by the UE, the SCG.

In an embodiment, further, the method includes detecting, by the UE, at least one of data pending in packet data convergence protocol (PDCP) is greater than a threshold, data received in downlink (DL) from the MCG is greater than a threshold, any data pending to transfer on SCG bearer, data, and an MCG failure. Further, the method includes reactivating, by the UE, the deactivated SCG.

In accordance with another aspect of the disclosure, a UE for controlling automatic deactivation and reactivation of a SCG in a MR-DC network is provided. The UE includes a memory storing information about the SCG and a SCG deactivation-reactivation controller communicatively connected to a memory and a processor. The SCG deactivation-reactivation controller is configured to detect at least one of a data inactivity timer configured for an MCG, a UE specific timer used for the SCG, or a C-DRX counter derived from the CDRX configuration for the SCG. Further, the SCG deactivation-reactivation controller is configured to detect an activation of the SCG. Further, the SCG deactivation-reactivation controller is configured to start at least one of the data inactivity timer configured for the MCG to use for automatic deactivation of the SCG, the UE specific timer used for the SCG to use for automatic deactivation of the SCG, and the C-DRX counter derived from the CDRX configuration for the SCG to use for automatic deactivation of the SCG by the UE. Further, the SCG deactivation-reactivation controller is configured to detect whether at least one of an expiry of the data inactivity timer configured for the MCG, an expiry of the UE specific timer used for the SCG, and the C-DRX counter derived from the CDRX configuration for the SCG is met. Further, the SCG deactivation-reactivation controller is configured to deactivate the SCG in response to detecting at least one of the expiry of the data inactivity timer configured for the MCG, the expiry of the UE specific timer used for the SCG, and the C-DRX counter derived from the CDRX configuration for the SCG is met.

In accordance with another aspect of the disclosure, a UE for controlling automatic deactivation and reactivation of a SCG in a MR-DC network is provided. The UE includes a memory storing information about the SCG and a SCG deactivation-reactivation controller communicatively connected to a memory and a processor. The SCG deactivation-reactivation controller is configured to detect whether DL data is less than a DL data threshold. Further, the SCG deactivation-reactivation controller is configured to detect UL data is less than a UL data threshold in response to determining that the DL data is less than the DL data threshold. Further, the SCG deactivation-reactivation controller is configured to prepare early deactivation of the SCG by stop forwarding the DL data and the UL data to the SCG in response to detecting that the UL data is less than the UL data threshold. Further, the SCG deactivation-reactivation controller is configured to deactivate the SCG.

Other aspects, advantages, and salient features of the disclosure will become apparent to those skilled in the art from the following detailed description, which, taken in conjunction with the annexed drawings discloses various embodiments of the disclosure.

BRIEF DESCRIPTION OF FIGURES

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION OF INVENTION

Figure 1:
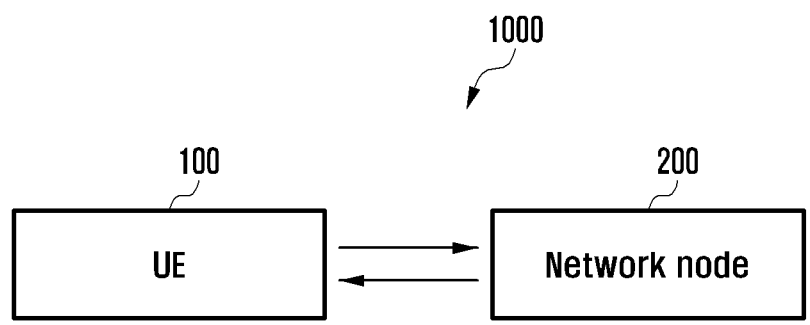
FIG. 1 is an overview of a MR-DC network for controlling of a SCG, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiment herein is to disclose a method for controlling of a SCG in a MR-DC network. The method includes detecting, by a network node, that a UE is in a connected state. Further, the method includes creating, by the network node, an SCG deactivation criteria including at least one of a data inactivity timer, a T3xy timer, and a C-DRX counter to deactivate the SCG for the UE. Further, the method includes sending, by the network node, an RRC message comprising the SCG deactivation criteria to the UE to trigger deactivation of the SCG.

In the proposed method, the trigger to deactivate a configured SCG can be based on one of the following Timer based method (e.g., upon expiry of dataInactivityTimer on the SCG, and upon expiry of a new timer e.g. SCG deactivation timer, T3xy etc.), this results in reducing the power consumption at the UE and the network node and complexity associated to dual connectivity operation, and improving data rate, maintain quality of service (QoS), better latency requirements, and better reliability.

Referring now to the drawings and more particularly to FIGS. 1, 2, 3, 4, 5, 6A, 6B, 6C, 7A, 7B, 7C, 7D, 8, 9, 10, 11, 12, 13A, 13B, 13C, 14, 15, 16, 17, 18, and 19, where similar reference characters denote corresponding features consistently throughout the figures, there are shown preferred embodiments.

FIG. 1 is an overview of a MR-DC network for controlling of a SCG, according to an embodiment of the disclosure.

Referring to FIG. 1, in an embodiment, an MR-DC network (1000) includes a UE (100) and one network node (200) (e.g., gNodeB or the like). The UE (100) can be, for example, but not limited to a laptop, a desktop computer, a notebook, a relay device, a Device-to-Device (D2D) device, a vehicle to everything (V2X) device, a smartphone, a tablet, an immersive device or the like.

The network node (200) is configured to detect that the UE (100) is in the connected state with the network node (200). Further, the network node (200) is configured to create a SCG deactivation criteria. The SCG deactivation criteria includes one or more data inactivity timer to deactivate the SCG, a T3xy timer to deactivate the SCG, and a C-DRX counter to deactivate the SCG. After creating the SCG deactivation criteria, the network node (200) is configured to send an RRC message including the SCG deactivation criteria to the UE (100) to trigger deactivation of the SCG. The RRC message includes an RRC configuration message and an RRC reconfiguration message.

Further, the network node (200) is configured to receive the indication from the UE (100) informing about the deactivation of the SCG by the UE (100). In an embodiment, the network node (200) is configured to receive the UE assistance information message, a new IE in an existing RRC message and a new RRC message from the UE (100) to indicate about the deactivation of the SCG by the UE (100). In another embodiment, the network node (200) is configured to receive a MAC CE from the UE (100) to indicate about the deactivation of the SCG by the UE (100). The MAC CE includes a SCG Deactivation-Reactivation field indicating MAC CE is triggered for UE autonomous deactivation of the SCG by the UE (100) and a reserved bit field. The MAC CE includes a SCG deactivation/activation (D/A) field indicating the deactivation of SCG by the UE (100).

In an embodiment, the UE (100) indicates the preference for deactivation or release of SCG to the network node (200). Accordingly, the network node (200) may perform either deactivation of SCG or release of the SCG. In an embodiment, the UE (100) capable of providing an indication for its preference for the SCG deactivation or SCG release may initiate the procedure upon being configured by the network node (200) to provide the indication in several cases e.g., when meeting deactivation criteria, the SCG deactivation based on timers and data inactivity. The network node (200) utilizes "Otherconfig" to configure the UE (i.e., network node 200) to send the UE assistance information message for SCG deactivation/release and/or activation. This may also include a prohibit timer to control the frequent transmission of the UE assistance information message.

In an embodiment, the UE assistance information message includes the field for "SCG deactivation or activation" and/or a preference for "SCG deactivation or SCG release". The UE (100) will set the field "SCG deactivation or activation" for deactivation for the purpose of SCG deactivation and/or set "SCG deactivation or SCG release" as needed for deactivation or release.

Further, the network node (200) is configured to receive the indication from the UE (100) to indicate that the SCG deactivation criteria to deactivate the SCG is met at the UE (100). After receiving the indication from the UE (100), the network node (200) is configured to deactivate the SCG and send a command to the UE (100) informing about the deactivation of the SCG by the network node (200).

In an embodiment, the network node (200) is configured to receive the indication from an RRC entity of the network node (200) for deactivation of the SCG by the network node (200) in response to receiving the indication from the UE (100). Further, the network node (200) is configured to identify the SCG corresponding to the SCG deactivation criteria by the RRC entity of the network node (200). Further, the network node (200) is configured to deactivate the SCG without releasing an RRC connection between the UE (100) and the network node (200) by the RRC entity of the network node (200).

In an embodiment, the network node (200) deactivates the SCG by sending one of RRC reconfiguration and a new IE in an existing RRC message e.g., RRC Resume message including an RRC reconfiguration to the UE (100). The RRC reconfiguration can include SCG state indicating deactivation for SCG. The deactivation can be indicated by either presence or absence of SCG state field in RRC reconfiguration message. The RRC reconfiguration message can be transmitted over signaling radio bearer e.g., SIB1.

In an embodiment, the network node (200) is configured to activate (or reactivate) the SCG by sending one of RRC reconfiguration and the new IE in an existing RRC message e.g., RRC Resume message including an RRC reconfiguration to the UE (100). The RRC reconfiguration can include SCG state indicating activation (or reactivation) for SCG. The activation (or reactivation) can be indicated by either presence or absence of SCG state field in RRC reconfiguration message. The RRC reconfiguration message can be transmitted over signaling radio bearer e.g., SIB1.

In an embodiment, the UE (100) capable of providing an indication for its preference for SCG activation or reactivation may initiate the procedure upon being configured by the network node (200) to provide the indication in several cases e.g., when meeting activation criteria, SCG activation based on a data pending in PDCP greater than a threshold, SCG activation based on a data received in a DL MCG greater than a threshold. The network node (200) utilizes "Otherconfig" to configure the UE (100) to send the UE assistance information message for SCG deactivation/release and/or activation. This may also include a prohibit timer to control the frequent transmission of the UE assistance information message.

Further, the network node (200) is configured to receive a request to reactivate the deactivated SCG from the UE (100) and reactivate the deactivated SCG. Further, the network node (200) is configured to send a command to the UE (100) to indicate about the reactivation of the deactivated SCG by the network node (200).

In an embodiment, the network node (200) is configured to receive the UE assistance information message, a new IE in an existing RRC message and a new RRC message from the UE (100) to reactivate of the SCG by the network node (200). In another embodiment, the network node (200) is configured to receive a MAC CE from the UE (100) to reactivate the SCG by the network node (200). The MAC CE comprises the SCG Deactivation-Reactivation field indicating MAC CE is triggered for reactivation of the SCG by the network node (200) and the reserved bit field.

In an embodiment, the network node (200) is configured to detect whether the SCG deactivation criteria is met when the UE (100) is in the connected state with the SCG. The SCG deactivation criteria is detected by determining that the data inactivity timer and the T3xy timer is configured for deactivation of the SCG by the network node (200), starting the data inactivity timer and the T3xy timer, monitoring whether there is a data activity at the network node (200) until expiry of the data inactivity timer and the T3xy timer, and detecting that the SCG deactivation criteria is met in response to determining that there is no data activity at the network node until expiry of the data inactivity timer and the T3xy timer. After detecting that the SCG deactivation criteria is met, the network node (200) is configured to deactivate the SCG and send a command to the UE (100) informing about the deactivation of the SCG by the network node (200).

In an embodiment, the SCG is deactivated by sending by a MAC entity of the network node (200) an indication to the RRC entity of the network node (200) for deactivation of the network node (200) in response to detecting that the SCG deactivation criteria is met, and deactivating by the RRC entity of the network node (200) the SCG without releasing an RRC connection between the UE (100) and the network node (200).

In another embodiment, the SCG is deactivated by sending by the MAC entity of the network node (200) an indication to the RRC entity of the network node (200) for deactivation of the SCG by the network node (200) in response to detecting that the SCG deactivation criteria is met at the network node (200), identifying by the RRC entity of the network node (200) the SCG corresponding to the SCG deactivation criteria, and deactivating by the RRC entity of the network node (200) the SCG without releasing an RRC connection between the UE (100) and the network node (200).

Further, the network node (200) is configured to restart the data inactivity timer and the T3xy timer in response to determining that there is data activity at the network node (200) before expiry of the data inactivity timer and the T3xy timer. Further, the network node (200) is configured to monitor whether there is the data activity at the network node (200) until expiry of the restarted data inactivity timer and the restarted T3xy timer. In response to determining that there is no data activity at the network node (200) until expiry of the restarted data inactivity timer and the restarted T3xy timer based on the monitoring, the network node (200) is configured to detect that the SCG deactivation criteria is met. In an embodiment, the network node (200) is configured to detect that the C-DRX counter is configured for deactivation of the SCG by the network node (200) and monitor C-DRX cycles for data transfer at the network node (200). Further, the network node (200) is configured to determine whether no data transfer at the network node (200) for configured number of DRX cycles in the C-DRX counter based on the monitoring. Further, the network node (200) is configured to detect that the SCG deactivation criteria is met in response to determining that the no data transfer at the network node (200) for the configured number of DRX cycles in the C-DRX counter based on the monitoring.

Further, the network node (200) is configured to detect whether the SCG reactivation criteria is met and reactivate the deactivated SCG in response to detecting that the SCG reactivation criteria is met at the network node (200), and send the indication to the UE (100) to indicate about the reactivation of the SCG by the network node (200).

Further, the network node (200) is configured to detect whether the SCG reactivation criteria is met send the command to the UE (100) to reactivate the deactivated SCG by the network node (200), and receive the indication from the UE (100) to indicate about the reactivation of the deactivated SCG by the UE (100).

The UE (100) is configured to receive the SCG deactivation criteria from the network node (200) when the UE (100) is in the connected state with the network node (200). Further, the UE (100) is configured to detect whether the SCG deactivation criteria is met. In an embodiment, the SCG deactivation criteria is detected by determining the data inactivity timer and the T3xy timer configured for deactivation of the SCG, starting the data inactivity timer and the T3xy timer, monitoring that there is a data activity at the UE (100) until expiry of the data inactivity timer and the T3xy timer, and detecting that the SCG deactivation criteria is met.

After detecting that the SCG deactivation criteria is met at the UE (100), the UE (100) is configured to deactivate the SCG. The SCG is deactivated by sending by the MAC entity of the UE (100) an indication to the RRC entity of the UE (100) for deactivation of the SCG in response to detecting that the SCG deactivation criteria is met, identifying by the RRC entity of the UE (100) the SCG corresponding to the SCG deactivation criteria, and deactivating by the RRC entity of the UE (100) the SCG without releasing an RRC connection between the UE (100) and the network node (200).

After detecting that the SCG deactivation criteria is met at the UE (100), the UE (100) is configured to deactivate the SCG and send a notification to the network node (200) informing about the deactivation of the SCG by the UE (100). In an embodiment, the UE (100) is configured to send the UE assistance information message, a new IE in an existing RRC message and a new RRC message to the network node (200) to indicate about the deactivation of the SCG by the UE (100). In an embodiment, the UE (100) is configured to send a MAC CE to the network node (200) to indicate about the deactivation of the SCG by the UE (100).

In another embodiment, the UE (100) is configured to send an indication from the UE (100) to indicate that the SCG deactivation criteria to deactivate the SCG is met at the UE (100), and receive a command informing about the deactivation of the SCG by the network node (200).

Further, the UE (100) is configured to restart the data inactivity timer and the T3xy timer in response to determining that there is data activity at the UE (100) before expiry of the data inactivity timer and the T3xy timer. Further, the UE (100) is configured to monitor whether there is the data activity at the UE (100) until expiry of the restarted data inactivity timer and the restarted T3xy timer. Further, the UE (100) is configured to detect that the SCG deactivation criteria is met in response to determining that there is no data activity at the UE (100) until expiry of at least one of the restarted data inactivity timer and the restarted T3xy timer based on the monitoring. In an embodiment, the SCG deactivation criteria is met detected by detecting that the C-DRX counter is configured for deactivation of the SCG, monitoring C-DRX cycles for data transfer at the UE (100), determining whether no data transfer at the UE (100) for configured number of DRX cycles in the C-DRX counter based on the monitoring, and detecting that the SCG deactivation criteria is met in response to determining that the no data transfer at the UE (100) for the configured number of DRX cycles in the C-DRX counter based on the monitoring.

Further, the UE (100) is configured to detect whether the SCG reactivation criteria is met. In an embodiment, the UE (100) is configured to reactivate the deactivated SCG in response to detecting that the SCG reactivation criteria is met, and sending the notification to the network node (200) to indicate about the reactivation of the SCG by the UE (100). In another embodiment, the UE (100) is configured to send an indication to the network node (200) to reactivate the deactivated SCG by the network node (200), and receiving an indication from the network node (200) to indicate about the reactivation of the deactivated SCG by the network node (200).

Further, the UE (100) is configured to detect the data inactivity timer configured for an MCG, a UE specific timer used for the SCG, and a C-DRX counter derived from the CDRX configuration for the SCG. Further, the UE (100) is configured to detect an activation of the SCG. Further, the UE (100) is configured to start the data inactivity timer configured for the MCG to use for automatic deactivation of the SCG, the UE specific timer used for the SCG to use for automatic deactivation of the SCG, and the C-DRX counter derived from the CDRX configuration for the SCG to use for automatic deactivation of the SCG by the UE (100). Further, the UE (100) is configured to detect whether the expiry of the data inactivity timer configured for the MCG, an expiry of the UE specific timer used for the SCG, and the C-DRX counter derived from the CDRX configuration for the SCG is met. The C-DRX counter criteria is met based on the CDRX configuration for the SCG and is detected by monitoring the C-DRX cycles of SCG for data transfer at the UE (100), determine whether no data transfer at the UE (100) for configured number of DRX cycles in the C-DRX counter based on the monitoring, and detect that the C-DRX counter derived from the CDRX configuration for the SCG is met in response to determining that the no data transfer at the UE (100) for the configured number of DRX cycles in the C-DRX counter based on the monitoring.

Further, the UE (100) is configured to deactivate the SCG in response to detecting the expiry of the data inactivity timer configured for the SCG, the expiry of the UE specific timer used for the SCG, and the C-DRX counter based on the CDRX configuration for the SCG is met. The SCG is deactivated by sending by a MAC entity of the UE (100) an indication to an RRC entity of the UE (100) for automatic deactivation of the SCG, and deactivate by the RRC entity of the UE (100) the SCG without releasing an RRC connection between the UE (100) and the network node (200).

Further, the UE (100) is configured to restart the data inactivity timer and the UE specific timer in response to determining that there is data activity at the UE (100) before expiry of the data inactivity timer and the UE specific timer. Further, the UE (100) is configured to monitor whether there is a data activity at the UE (100) until expiry of the restarted data inactivity timer and the restarted UE specific timer.

Further, the UE (100) is configured to detect the data pending in PDCP is greater than a threshold, data received in DL from the MCG is greater than a threshold, any data pending to transfer on SCG bearer, and an MCG failure. Further, the UE (100) is configured to reactivate the deactivated SCG.

In an embodiment, the UE (100) is configured to detect whether DL data is less than a DL data threshold. Further, the UE (100) is configured to detect UL data is less than a UL data threshold in response to determining that the DL data is less than the DL data threshold. Further, the UE (100) is configured to prepare early deactivation of the SCG by stop forwarding the DL data and the UL data to the SCG in response to detecting that the UL data is less than the UL data threshold. The UE (100) is configured to deactivate the SCG.

Further, the UE (100) is configured to detect the data pending in the PDCP is greater than a threshold, data received in the DL from the MCG is greater than the threshold, any data pending to transfer on SCG bearer, and an MCG failure. The UE (100) is configured to reactivate the deactivated SCG.

Figure 2:
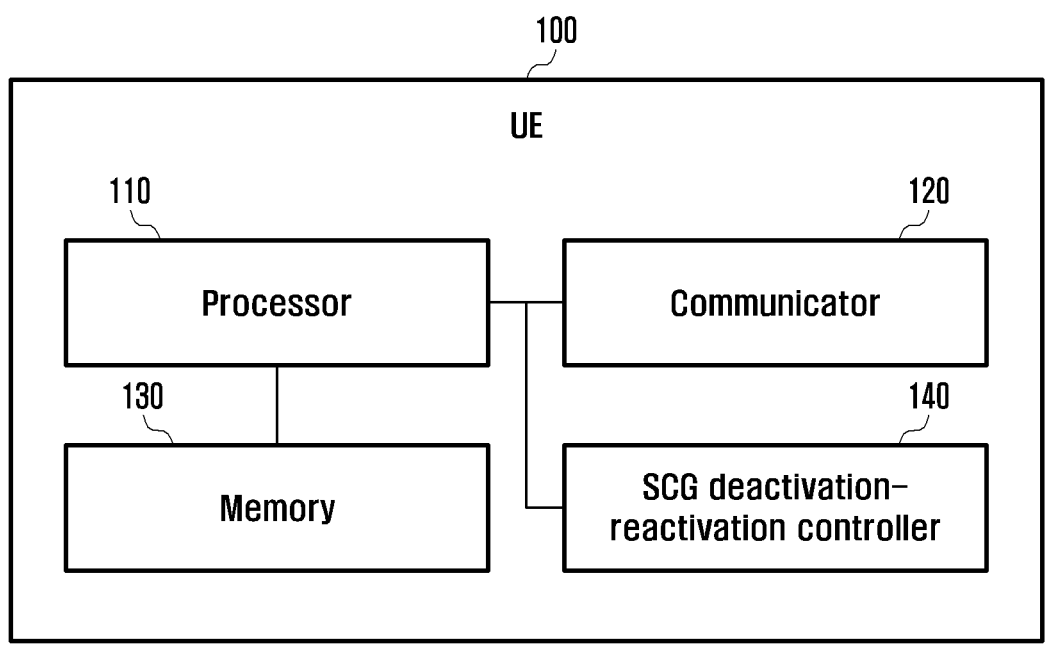
FIG. 2 shows various hardware components of a UE, according to an embodiment of the disclosure.

FIG. 2 shows various hardware components of a UE (100), according to an embodiment of the disclosure.

Referring to FIG. 2, the UE (100) includes a processor (110), a communicator (120), a memory (130) storing information about the SCG, and an SCG deactivation-reactivation controller (140). The processor (110) is communicatively connected to the communicator (120), the memory (130) and the SCG deactivation-reactivation controller (140).

The SCG deactivation-reactivation controller (140) is configured to receive the SCG deactivation criteria from the network node (200), when the UE (100) is in the connected state with the network node (200). Further, the SCG deactivation-reactivation controller (140) is configured to detect whether the SCG deactivation criteria is met. In an embodiment, the SCG deactivation criteria is detected by determining the data inactivity timer and the T3xy timer configured for deactivation of the SCG, starting the data inactivity timer and the T3xy timer, monitoring that there is the data activity at the UE (100) until expiry of the data inactivity timer and the T3xy timer, and detecting that the SCG deactivation criteria is met.

After detecting that the SCG deactivation criteria is met at the UE (100), the SCG deactivation-reactivation controller (140) is configured to deactivate the SCG. The SCG is deactivated by sending by the MAC entity of the UE (100) an indication to an RRC entity of the UE (100) for deactivation of the SCG in response to detecting that the SCG deactivation criteria is met, identifying by the RRC entity of the UE (100) the SCG corresponding to the SCG deactivation criteria, and deactivating by the RRC entity of the UE (100) the SCG without releasing an RRC connection between the UE (100) and the network node (200).

After detecting that the SCG deactivation criteria is met at the UE (100), the SCG deactivation-reactivation controller (140) is configured to deactivate the SCG and send the notification to the network node (200) informing about the deactivation of the SCG by the UE (100). In an embodiment, the SCG deactivation-reactivation controller (140) is configured to send the UE assistance information message, the new IE in the existing RRC message and the new RRC message to the network node (200) to indicate about the deactivation of the SCG by the UE (100). In an embodiment, the SCG deactivation-reactivation controller (140) is configured to send the MAC CE to the network node (200) to indicate about the deactivation of the SCG by the UE (100).

In another embodiment, the SCG deactivation-reactivation controller (140) is configured to send the indication from the UE (100) to indicate that the SCG deactivation criteria to deactivate the SCG is met at the UE (100), and receive the command informing about the deactivation of the SCG by the network node (200).

Further, the SCG deactivation-reactivation controller (140) is configured to restart the data inactivity timer and the T3xy timer in response to determining that there is data activity at the UE (100) before expiry of the data inactivity timer and the T3xy timer. Further, the SCG deactivation-reactivation controller (140) is configured to monitor whether there is the data activity at the UE (100) until expiry of the restarted data inactivity timer and the restarted T3xy timer. Further, the SCG deactivation-reactivation controller (140) is configured to detect that the SCG deactivation criteria is met in response to determining that there is no data activity at the UE (100) until expiry of the restarted data inactivity timer and the restarted T3xy timer based on the monitoring.

In an embodiment, the SCG deactivation criteria is met detected by detecting that the C-DRX counter is configured for deactivation of the SCG, monitoring C-DRX cycles for data transfer at the UE (100), determining whether no data transfer at the UE (100) for configured number of DRX cycles in the C-DRX counter based on the monitoring, and detecting that the SCG deactivation criteria is met in response to determining that the no data transfer at the UE (100) for the configured number of DRX cycles in the C-DRX counter based on the monitoring.

Further, the SCG deactivation-reactivation controller (140) is configured to detect whether the SCG reactivation criteria is met. In an embodiment, the SCG deactivation-reactivation controller (140) is configured to reactivate the deactivated SCG in response to detecting that the SCG reactivation criteria is met, and sending the notification to the network node (200) to indicate about the reactivation of the SCG by the UE (100). In another embodiment, the SCG deactivation-reactivation controller (140) is configured to send the indication to the network node (200) to reactivate the deactivated SCG by the network node (200), and receiving an indication from the network node (200) to indicate about the reactivation of the deactivated SCG by the network node (200).

Further, the SCG deactivation-reactivation controller (140) is configured to detect the data inactivity timer configured for the MCG, the UE specific timer used for the SCG, and the C-DRX counter configured for the SCG. Further, the SCG deactivation-reactivation controller (140) is configured to detect the activation of the SCG. Further, the SCG deactivation-reactivation controller (140) is configured to start the data inactivity timer configured for the SCG to use for automatic deactivation of the SCG, the UE specific timer used for the SCG to use for automatic deactivation of the SCG, and the C-DRX counter derived from the CDRX configuration for the SCG to use for automatic deactivation of the SCG by the UE (100). Further, the SCG deactivation-reactivation controller (140) is configured to detect whether the expiry of the data inactivity timer configured for the SCG, an expiry of the UE specific timer used for the SCG, and the C-DRX counter derived from the CDRX configuration for the SCG is met. The C-DRX counter derived from the CDRX configuration for the SCG is detected by monitoring the C-DRX cycles for data transfer at the UE (100), determine whether no data transfer at the UE (100) for configured number of DRX cycles in the C-DRX counter based on the monitoring, and detect that the C-DRX counter derived from the CDRX configuration for the SCG is met in response to determining that the no data transfer at the UE (100) for the configured number of DRX cycles in the C-DRX counter based on the monitoring.

Further, the SCG deactivation-reactivation controller (140) is configured to deactivate the SCG in response to detecting the expiry of the data inactivity timer configured for the SCG, the expiry of the UE specific timer used for the SCG, and the C-DRX counter derived from the CDRX configuration for the SCG is met. The SCG is deactivated by sending by the MAC entity of the UE (100) an indication to the RRC entity of the UE (100) for automatic deactivation of the SCG, and deactivate by the RRC entity of the UE (100) the SCG without releasing an RRC connection between the UE (100) and the network node (200).

Further, the SCG deactivation-reactivation controller (140) is configured to restart the data inactivity timer and the UE specific timer in response to determining that there is data activity at the UE (100) before expiry of the data inactivity timer and the UE specific timer. Further, the SCG deactivation-reactivation controller (140) is configured to monitor whether there is the data activity at the UE (100) until expiry of the restarted data inactivity timer and the restarted UE specific timer.

Further, the SCG deactivation-reactivation controller (140) is configured to detect the data pending in the PDCP is greater than the threshold, data received in DL from the MCG is greater than the threshold, any data pending to transfer on SCG bearer, and the MCG failure. Further, the SCG deactivation-reactivation controller (140) is configured to reactivate the deactivated SCG.

In an embodiment, the SCG deactivation-reactivation controller (140) is configured to detect whether DL data is less than a DL data threshold. Further, the SCG deactivation-reactivation controller (140) is configured to detect UL data is less than a UL data threshold in response to determining that the DL data is less than the DL data threshold. The SCG deactivation-reactivation controller (140) is configured to prepare early deactivation of the SCG by stop forwarding the DL data and the UL data to the SCG in response to detecting that the UL data is less than the UL data threshold. The SCG deactivation-reactivation controller (140) is configured to deactivate the SCG.

Further, the SCG deactivation-reactivation controller (140) is configured to detect the data pending in the PDCP is greater than a threshold, data received in the DL from the MCG is greater than the threshold, any data pending to transfer on SCG bearer, and an MCG failure. The SCG deactivation-reactivation controller is configured to reactivate the deactivated SCG.

The SCG deactivation-reactivation controller (140) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Although the FIG. 2 shows various hardware components of the UE (100) but it is to be understood that other embodiments are not limited thereon. In other embodiments, the UE (100) may include less or more number of components. Further, the labels or names of the components are used only for illustrative purpose and does not limit the scope of the disclosure. One or more components can be combined together to perform same or substantially similar function in the UE (100).

Figure 3:
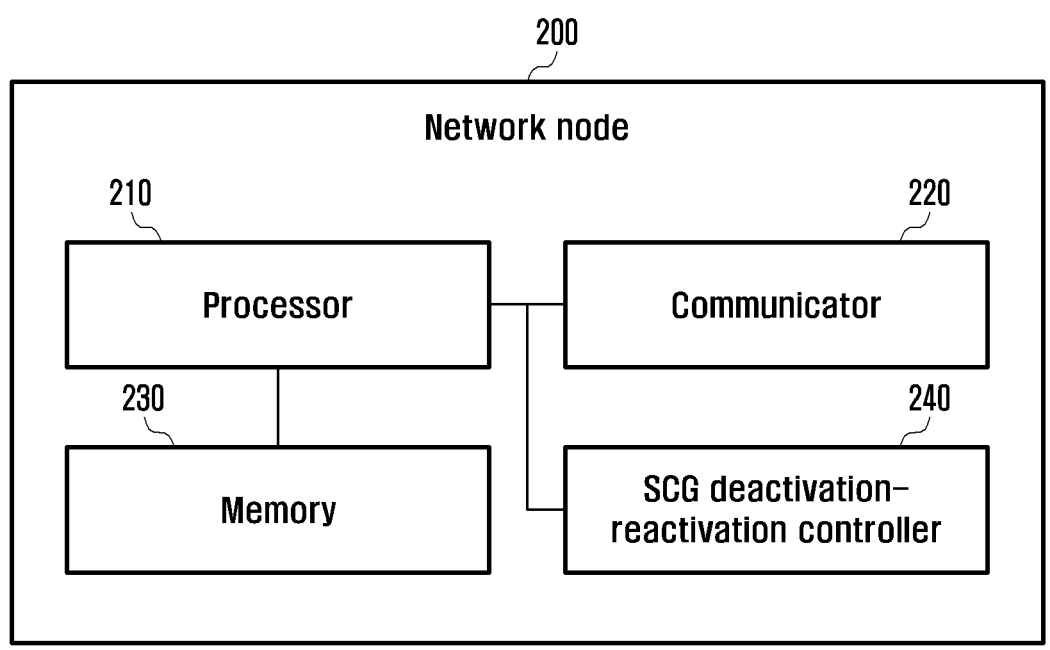
FIG. 3 shows various hardware components of a network node, according to an embodiment of the disclosure.

FIG. 3 shows various hardware components of a network node (e.g., gNodeB), according to an embodiment of the disclosure.

Referring to FIG. 3, the network node (200) includes a processor (210), a communicator (220), a memory (230) storing information about the SCG, and a SCG deactivation-reactivation controller (240). The processor (210) is communicatively connected to the communicator (220), the memory (230), and the SCG deactivation-reactivation controller (240). The SCG deactivation-reactivation controller (240) is configured to detect that the UE (100) is in the connected state with the network node (200). Further, the SCG deactivation-reactivation controller (240) is configured to create the SCG deactivation criteria includes one or more the data inactivity timer to deactivate the SCG, the T3xy timer to deactivate the SCG, and the C-DRX counter to deactivate the SCG. After creating the SCG deactivation criteria, the SCG deactivation-reactivation controller (240) is configured to send the RRC message including the SCG deactivation criteria to the UE (100) to trigger deactivation of the SCG. The RRC message includes the RRC configuration message and the RRC reconfiguration message.

Further, the SCG deactivation-reactivation controller (240) is configured to receive the indication from the UE (100) informing about the deactivation of the SCG by the UE (100). In an embodiment, the SCG deactivation-reactivation controller (240) is configured to receive the UE assistance information message, the new IE in the existing RRC message and the new RRC message from the UE (100) to indicate about the deactivation of the SCG by the UE (100). In another embodiment, the SCG deactivation-reactivation controller (240) is configured to receive the MAC CE from the UE (100) to indicate about the deactivation of the SCG by the UE (100). The MAC CE includes a SCG Deactivation-Reactivation field indicating MAC CE is triggered for UE autonomous deactivation of the SCG by the UE (100) and the reserved bit field. The MAC CE includes the SCG deactivation/activation (D/A) field indicating the deactivation of SCG by the UE (100).

Further, the SCG deactivation-reactivation controller (240) is configured to receive the indication from the UE (100) to indicate that the SCG deactivation criteria to deactivate the SCG is met at the UE (100). After receiving the indication from the UE (100), the SCG deactivation-reactivation controller (240) is configured to deactivate the SCG and send the command to the UE (100) informing about the deactivation of the SCG by the network node (200).

In an embodiment, the SCG deactivation-reactivation controller (240) is configured to receive the indication from the RRC entity of the network node (200) for deactivation of the SCG by the network node (200) in response to receiving the indication from the UE (100). Further, the SCG deactivation-reactivation controller (240) is configured to identify the SCG corresponding to the SCG deactivation criteria by the RRC entity of the network node (200). Further, the SCG deactivation-reactivation controller (240) is configured to deactivate the SCG without releasing an RRC connection between the UE (100) and the network node (200) by the RRC entity of the network node (200).

Further, the SCG deactivation-reactivation controller (240) is configured to receive the request to reactivate the deactivated SCG from the UE (100) and reactivate the deactivated SCG. Further, the SCG deactivation-reactivation controller (240) is configured to send the command to the UE (100) to indicate about the reactivation of the deactivated SCG by the network node (200).

In an embodiment, the SCG deactivation-reactivation controller (240) is configured to receive the UE assistance information message, the new IE in the existing RRC message and the new RRC message from the UE (100) to reactivate of the SCG by the network node (200). In another embodiment, the SCG deactivation-reactivation controller (240) is configured to receive the MAC CE from the UE (100) to reactivate the SCG by the network node (200). The MAC CE comprises the SCG Deactivation-Reactivation field indicating MAC CE is triggered for reactivation of the SCG by the network node (200) and the reserved bit field.

In an embodiment, the SCG deactivation-reactivation controller (240) is configured to detect whether the SCG deactivation criteria is met when the UE (100) is in the connected state with the SCG. The meeting of the SCG deactivation criteria is detected by determining that the data inactivity timer and the T3xy timer is configured for deactivation of the SCG by the network node (200), starting the data inactivity timer and the T3xy timer, monitoring whether there is a data activity at the network node (200) until expiry of the data inactivity timer and the T3xy timer, and detecting that the SCG deactivation criteria is met in response to determining that there is no data activity at the network node (200) until expiry of at least one of the data inactivity timer and the T3xy timer. After detecting that the SCG deactivation criteria is met, the SCG deactivation-reactivation controller (240) is configured to deactivate the SCG and send the command to the UE (100) informing about the deactivation of the SCG by the network node (200). In an embodiment, the SCG is deactivated by sending by the MAC entity of the network node (200) an indication to the RRC entity of the network node for deactivation of the network node (200) in response to detecting that the SCG deactivation criteria is met, and deactivating by the RRC entity of the network node the SCG without releasing an RRC connection between the UE (100) and the network node (200). In another embodiment, the SCG is deactivated by sending by the MAC entity of the network node (200) an indication to the RRC entity of the network node (200) for deactivation of the SCG by the network node (200) in response to detecting that the SCG deactivation criteria is met at the network node (200), identifying by the RRC entity of the network node (200) the SCG corresponding to the SCG deactivation criteria, and deactivating by the RRC entity of the network node (200) the SCG without releasing an RRC connection between the UE (100) and the network node (200).

Further, the SCG deactivation-reactivation controller (240) is configured to restart the data inactivity timer and the T3xy timer in response to determining that there is data activity at the network node (200) before expiry of the data inactivity timer and the T3xy timer. Further, the SCG deactivation-reactivation controller (240) is configured to monitor whether there is the data activity at the network node (200) until expiry of the restarted data inactivity timer and the restarted T3xy timer. In response to determining that there is no data activity at the network node (200) until expiry of the restarted data inactivity timer and the restarted T3xy timer based on the monitoring, the SCG deactivation-reactivation controller (240) is configured to detect that the SCG deactivation criteria is met. In an embodiment, the SCG deactivation-reactivation controller (240) is configured to detect that the C-DRX counter is configured for deactivation of the SCG by the network node (200) and monitor C-DRX cycles for data transfer at the network node (200). Further, the SCG deactivation-reactivation controller (240) is configured to determine whether no data transfer at the network node for configured number of DRX cycles in the C-DRX counter based on the monitoring. Further, the SCG deactivation-reactivation controller (240) is configured to detect that the SCG deactivation criteria is met in response to determining that the no data transfer at the network node for the configured number of DRX cycles in the C-DRX counter based on the monitoring.

Further, the SCG deactivation-reactivation controller (240) is configured to detect whether the SCG reactivation criteria is met and reactivate the deactivated SCG in response to detecting that the SCG reactivation criteria is met at the network node (200), and send the indication to the UE (100) to indicate about the reactivation of the SCG by the network node (200).

Further, the SCG deactivation-reactivation controller (240) is configured to detect whether the SCG reactivation criteria is met send the command to the UE (100) to reactivate the deactivated SCG by the network node (200), and receive the indication from the UE (100) to indicate about the reactivation of the deactivated SCG by the UE (100).

The SCG deactivation-reactivation controller (240) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (210) is configured to execute instructions stored in the memory (230) and to perform various processes. The communicator (220) is configured for communicating internally between internal hardware components and with external devices via one or more networks. The memory (230) also stores instructions to be executed by the processor (210). The memory (230) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in random access memory (RAM) or cache).

Although the FIG. 3 shows various hardware components of the network node (200) but it is to be understood that other embodiments are not limited thereon. In other embodiments, the network node (200) may include less or more number of components. Further, the labels or names of the components are used only for illustrative purpose and does not limit the scope of the disclosure. One or more components can be combined together to perform same or substantially similar function in the network node (200).

Figure 4:
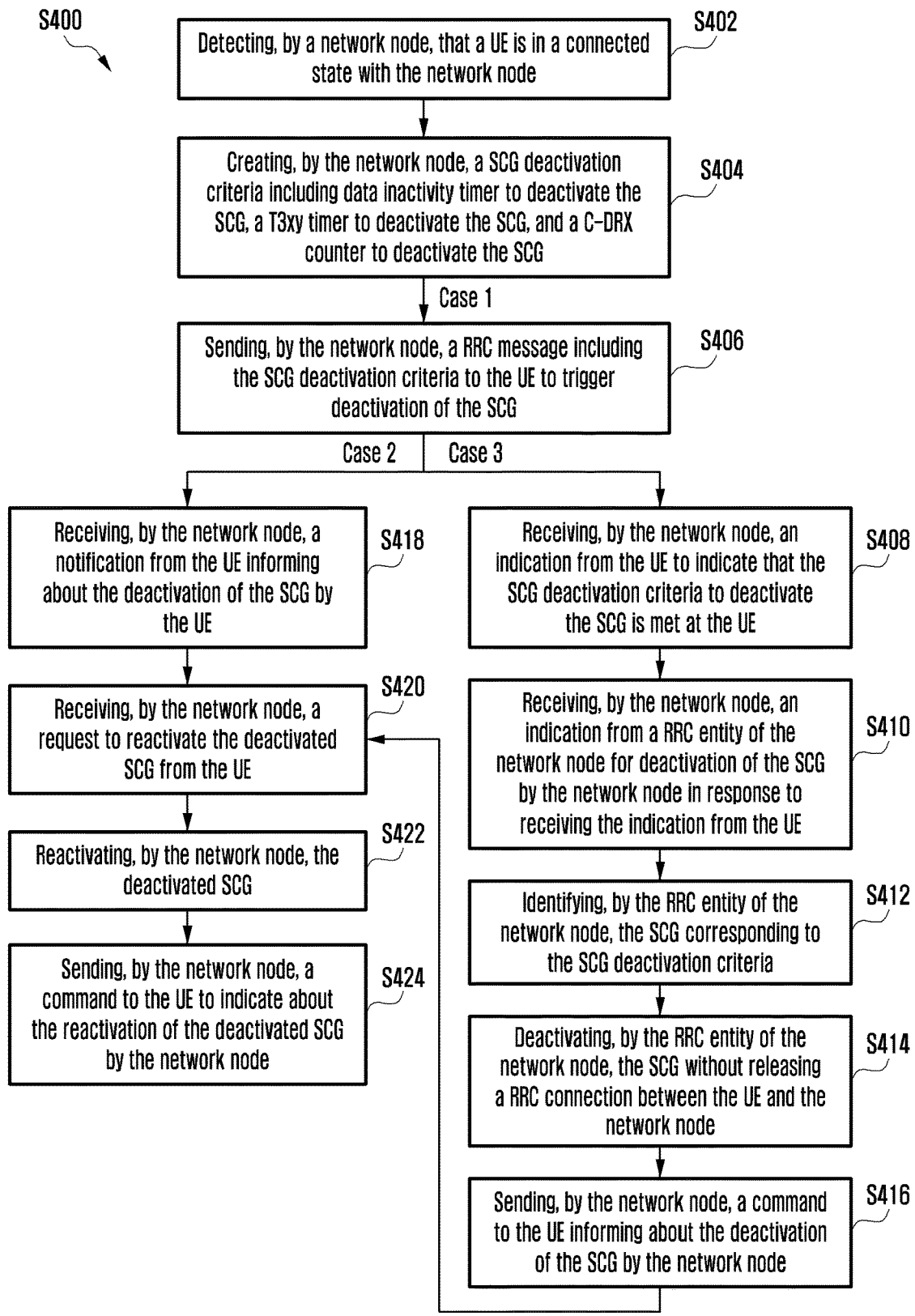
FIG. 4 is a flow chart illustrating a method, implemented by a network node, for controlling of an SCG in an MR-DC network, according to an embodiment of the disclosure.

FIG. 4 is a flow chart illustrating a method, implemented by a network node, for controlling of an SCG in an MR-DC network, according to an embodiment of the disclosure.

Referring to FIG. 4, in a method S400, the operations S402-S424 are performed by the SCG deactivation-reactivation controller (240).

At operation S402, the method includes detecting that the UE (100) is in the connected state with the network node (200). At operation S404, the method includes creating the SCG deactivation criteria including the data inactivity timer to deactivate the SCG, the T3xy timer to deactivate the SCG, and the C-DRX counter to deactivate the SCG. At operation S406, the method includes sending the RRC message including the SCG deactivation criteria to the UE (100) to trigger deactivation of the SCG. At operation S408, the method includes receiving the indication from the UE (100) to indicate that the SCG deactivation criteria to deactivate the SCG is met at the UE (100). At operation S410, the method includes receiving the indication from the RRC entity of the network node (200) for deactivation of the SCG by the network node (200) in response to receiving the indication from the UE (100).

At operation S412, the method includes identifying the SCG corresponding to the SCG deactivation criteria by the RRC entity of the network node (200). At operation S414, the method includes deactivating the SCG without releasing the RRC connection between the UE (100) and the network node (200) by the RRC entity of the network node (200). At operation S416, the method includes sending the command to the UE (100) informing about the deactivation of the SCG by the network node (200). At operation S418, the method includes receiving the notification from the UE (100) informing about the deactivation of the SCG by the UE (100). At operation S420, the method includes receiving the request to reactivate the deactivated SCG from the UE (100). At operation S422, the method includes reactivating the deactivated SCG. At operation S424, the method includes sending the command to the UE (100) to indicate about the reactivation of the deactivated SCG by the network node (200).

Figure 5:
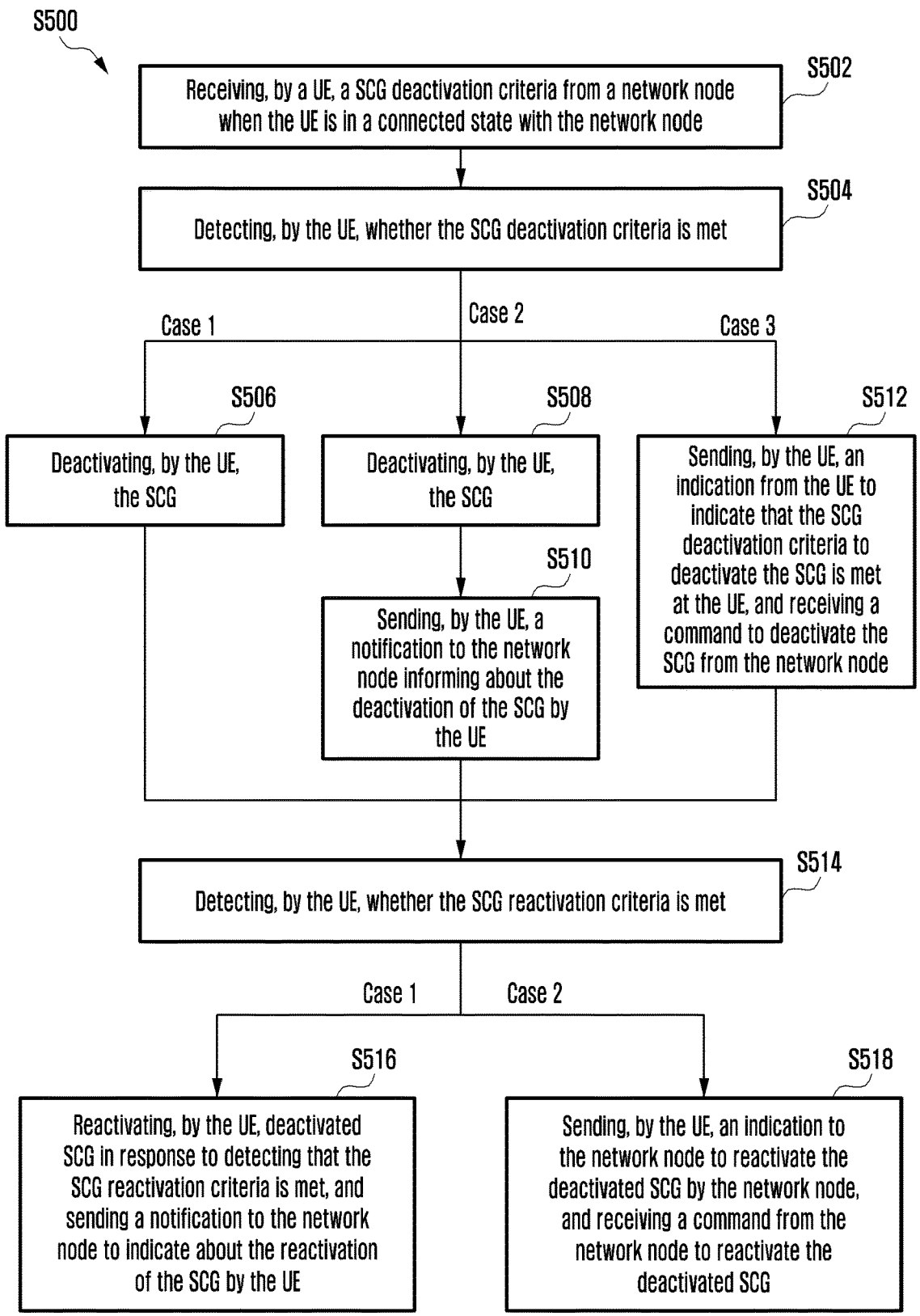
FIG. 5 is a flow chart illustrating a method, implemented by a UE, for controlling of an SCG in an MR-DC network, according to an embodiment of the disclosure.

FIG. 5 is a flow chart illustrating a method, implemented by a UE, for controlling of an SCG in an MR-DC network, according to an embodiment of the disclosure.

Referring to FIG. 5, in a method S500, the operations S502-S518 are performed by the SCG deactivation-reactivation controller (140).

At operation S502, the method includes receiving the SCG deactivation criteria from the network node (200) when the UE (100) is in the connected state with the network node (200). At operation S504, the method includes detecting whether the SCG deactivation criteria is met. At operation S506, the method includes deactivating the SCG. At operation S508, the method includes deactivating the SCG. At operation S510, the method includes sending the notification to the network node (200) informing about the deactivation of the SCG by the UE (100). At operation S512, the method includes sending the indication from the UE (100) to indicate that the SCG deactivation criteria to deactivate the SCG is met at the UE (100) and receiving the command to deactivate the SCG from the network node (200). At operation S514, the method includes detecting whether the SCG reactivation criteria is met.

At operation S516, the method includes reactivating the deactivated SCG in response to detecting that the SCG reactivation criteria is met and sending the notification to the network node (200) to indicate about the reactivation of the SCG by the UE (100). At operation S518, the method includes sending the indication to the network node (200) to reactivate the deactivated SCG by the network node (200) and receiving the command from the network node (200) to reactivate the deactivated SCG.

Figure 6A:
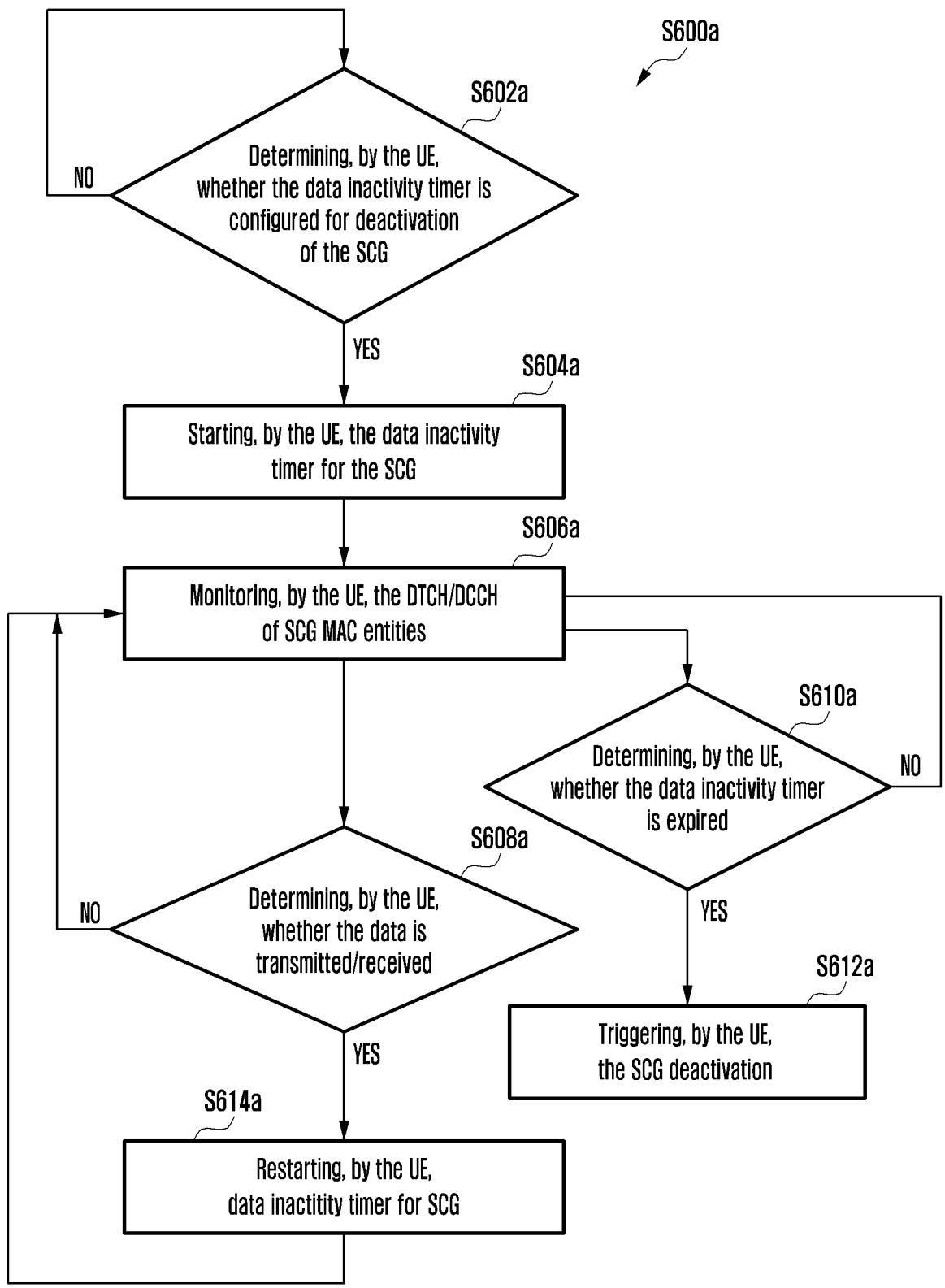
FIG. 6A is an example flow chart illustrating a method, implemented by a UE, for triggering an SCG deactivation based on a data inactivity timer, according to an embodiment of the disclosure.

FIG. 6A is an example flow chart illustrating a method, implemented by a UE, for triggering an SCG deactivation based on a data inactivity timer, according to an embodiment of the disclosure.

Referring to FIG. 6A, in a method S600a, the operations S602a-S614a are performed by the SCG deactivation-reactivation controller (140).

At operation S602a, the method includes determining whether the data inactivity timer is configured for deactivation of the SCG. If the data inactivity timer is not configured for deactivation of the SCG then, the method again performs the operation S602a. If the data inactivity timer is configured for the deactivation of the SCG then, at operation S604a, the method includes starting the data inactivity timer for the SCG. At operation S606a, the method includes monitoring the dedicated traffic channel (DTCH) or dedicated control channel (DCCH) of CCG MAC entities. At operation S608a, the method includes determining whether the data is transmitted/received at the UE (100). If the data is transmitted/received at the UE (100) then, at operation S614a, the method includes restarting the data inactivity timer for the SCG. If the data is not transmitted/received at the UE (100) then, the method again performs the operation S606a. At operation S610a, the method includes determining whether the data inactivity timer is expired. If the data inactivity timer is not expired then, at operation S606a, the method includes monitoring the DTCH/DCCH of CCG MAC entities. If the data inactivity timer is expired then, at operation S612a, the method includes triggering the SCG deactivation.

Figure 6B:
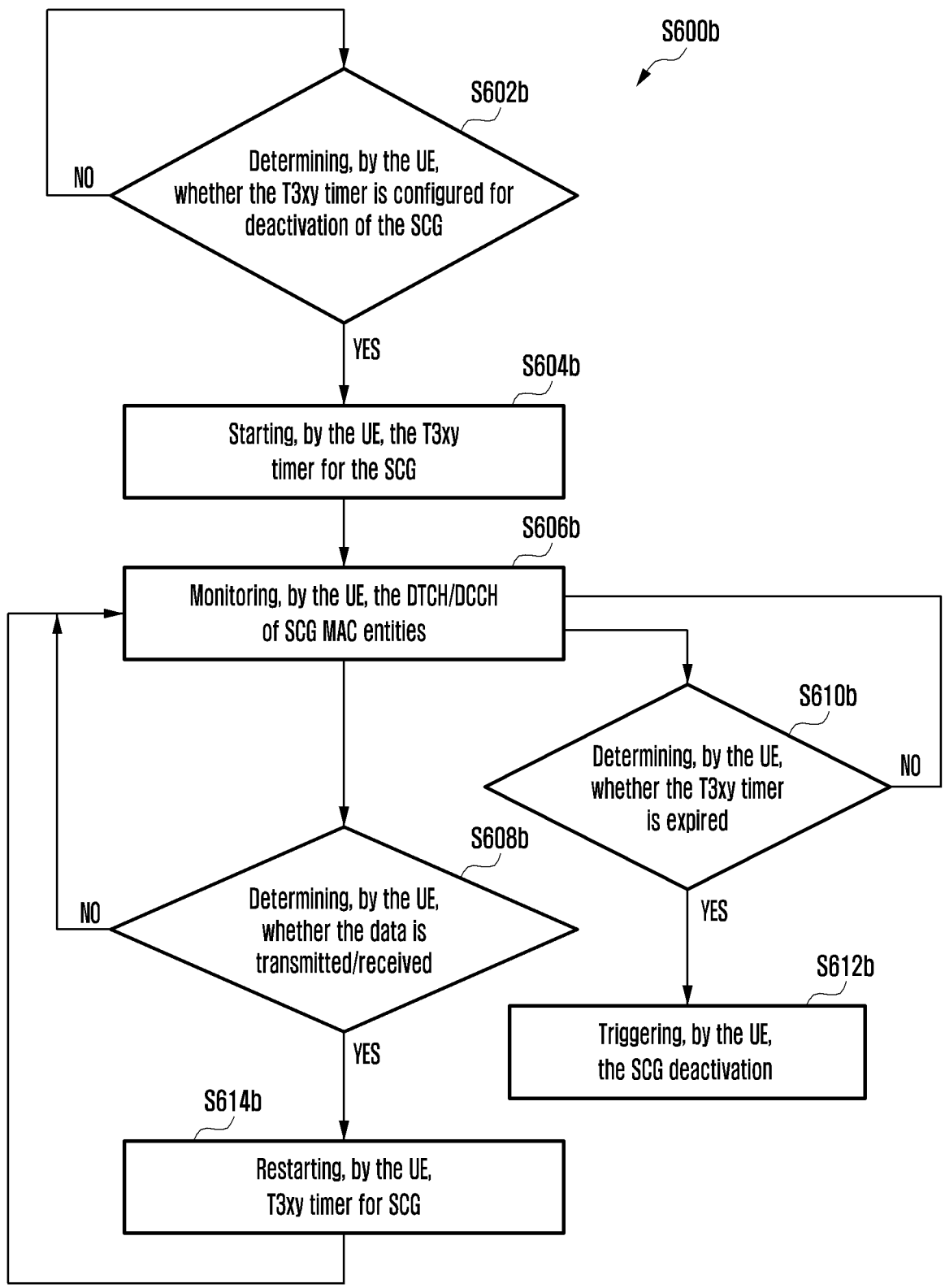
FIG. 6B is an example flow chart illustrating a method, implemented by a UE, for triggering an SCG deactivation based on a T3xy timer, according to an embodiment of the disclosure.

FIG. 6B is an example flow chart illustrating a method, implemented by a UE, for triggering an SCG deactivation based on a T3xy timer, according to an embodiment of the disclosure.

Referring to FIG. 6B, in a method S600b the operations S602b-S614b are performed by the SCG deactivation-reactivation controller (140).

At operation S602b, the method includes determining whether the T3xy timer is configured for deactivation of the SCG. If the T3xy timer is not configured for deactivation of the SCG then, the method again performs the operation S602b. If the T3xy timer is configured for the deactivation of the SCG then, at operation S604b, the method includes starting the T3xy timer for the SCG. At operation S606b, the method includes monitoring the DTCH/DCCH of CCG MAC entities. At operation S608b, the method includes determining whether the data is transmitted/received at the UE (100). If the data is transmitted/received at the UE (100) then, at operation S614b, the method includes restarting the T3xy timer for the SCG. If the data is not transmitted/received at the UE (100) then, the method again performs the operation S606b. At operation S610b, the method includes determining whether the T3xy timer is expired. If the T3xy timer is not expired then, at operation S606a, the method includes monitoring the DTCH/DCCH of CCG MAC entities. If the T3xy timer is expired then, at operation S612b, the method includes triggering the SCG deactivation.

Figure 6C:
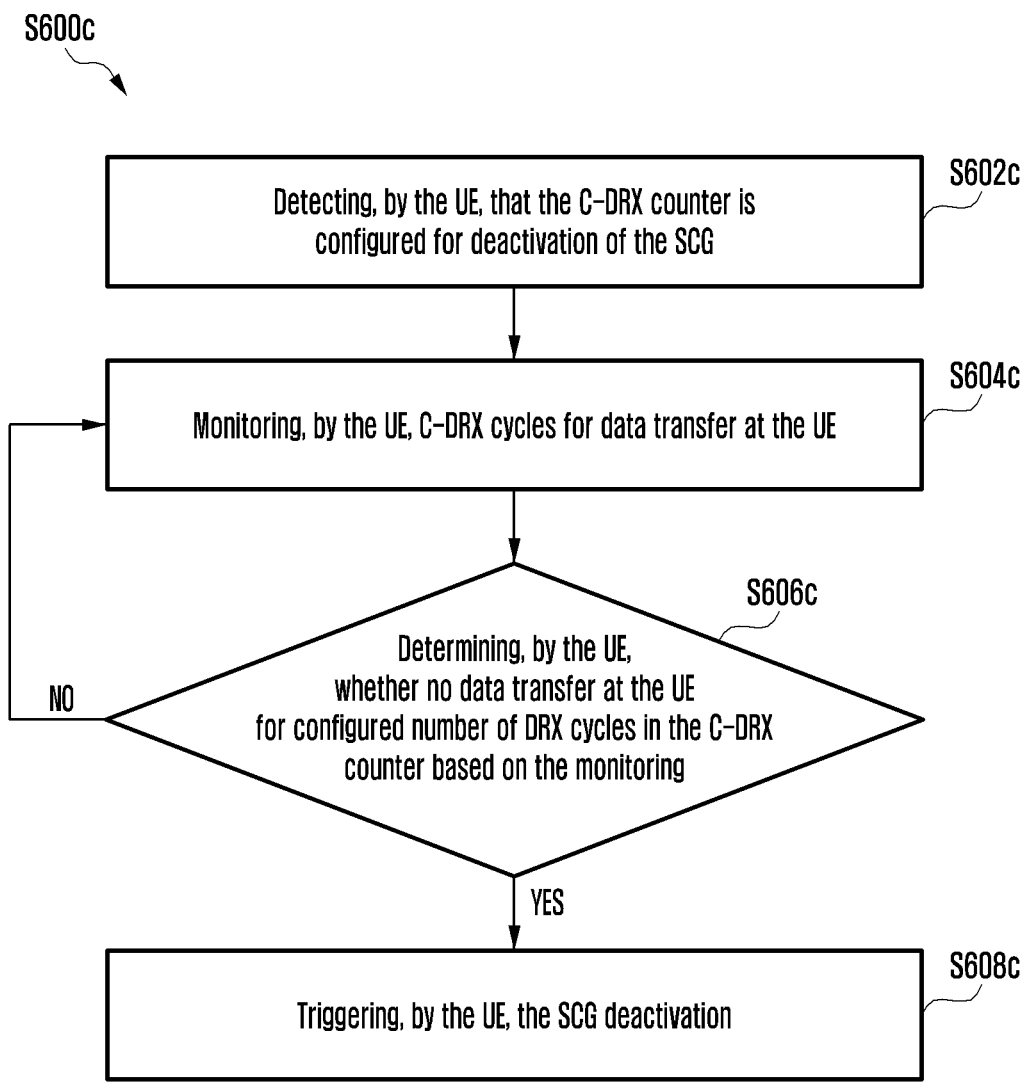
FIG. 6C is an example flow chart illustrating a method, implemented by a UE, for triggering an SCG deactivation based on a C-DRX counter, according to an embodiment of the disclosure.

FIG. 6C is an example flow chart S600c illustrating a method, implemented by a UE, for triggering an SCG deactivation based on a C-DRX counter, according to an embodiment of the disclosure.

Referring to FIG. 6C, in a method S600c the operations S602c-S608c are performed by the SCG deactivation-reactivation controller (140).

At operation S602c, the method includes detecting that the C-DRX counter is configured for deactivation of the SCG. At operation S604c, the method includes monitoring the C-DRX cycles for data transfer at the UE (100). At operation S606c, the method includes determining whether no data transfer at the UE (100) for configured number of DRX cycles in the C-DRX counter based on the monitoring. If no data transfer at the UE (100) for configured number of DRX cycles in the C-DRX counter then, at operation S608c, the method includes triggering the SCG deactivation. If data is transferred at the UE (100) for configured number of DRX cycles in the C-DRX counter then, at operation S604c, the method includes monitoring the C-DRX cycles for data transfer at the UE (100).

Figure 7A:
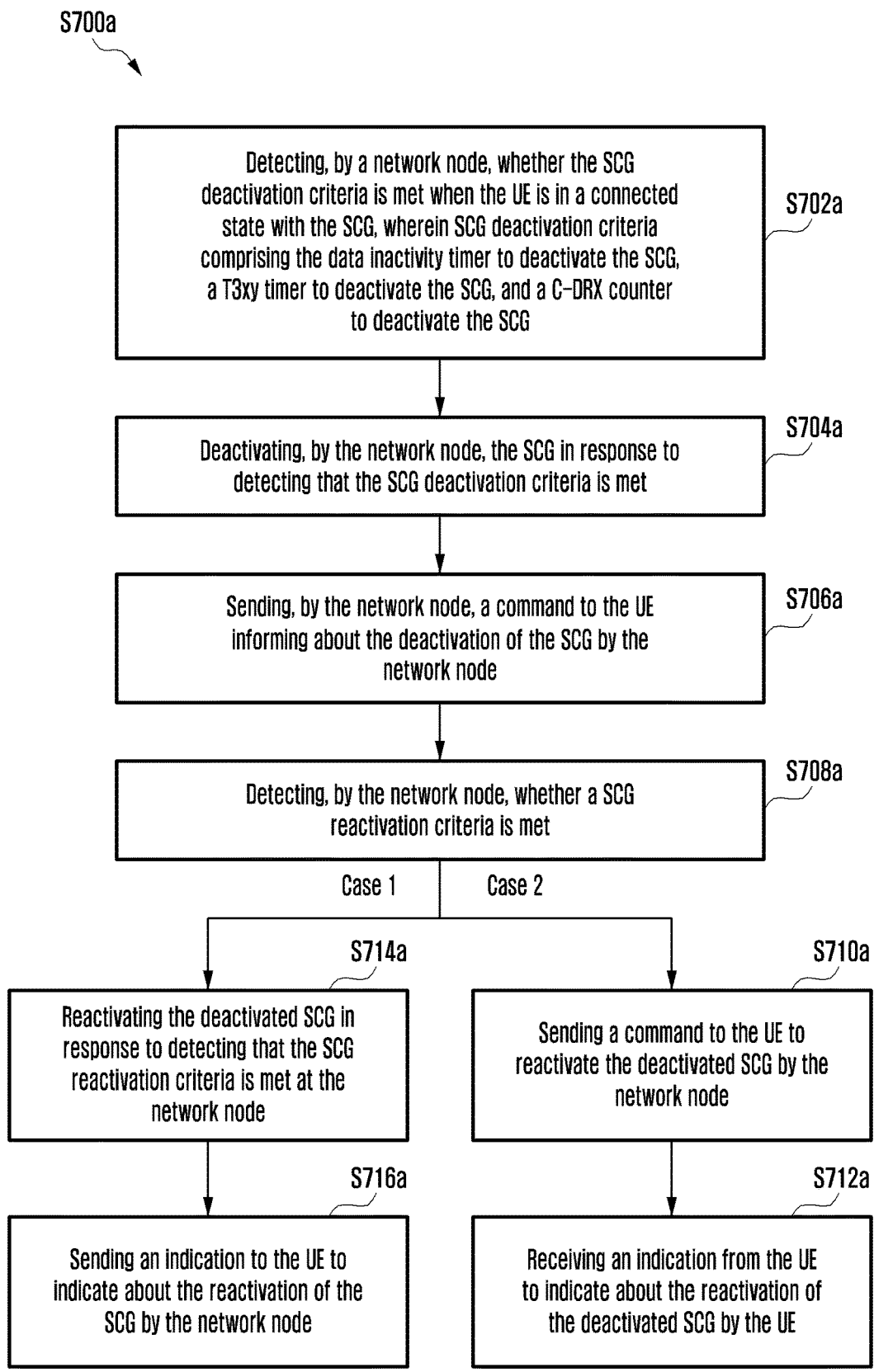
FIG. 7A is an example flow chart illustrating a method, implemented by a network node, for receiving an indication from a UE to indicate about reactivation of a deactivated SCG by the UE, according to an embodiment of the disclosure.

FIG. 7A is an example flow chart illustrating a method, implemented by a network node, for receiving the indication from a UE to indicate about the reactivation of a deactivated SCG by the UE, according to an embodiment of the disclosure.

Referring to FIG. 7A, in a method S700a, the operations S702a-S716a are performed by the SCG deactivation-reactivation controller (240).

At operation S702a, the method includes detecting whether the SCG deactivation criteria is met when the UE (100) is in the connected state with the SCG. The SCG deactivation criteria including the data inactivity timer to deactivate the SCG, the T3xy timer to deactivate the SCG, and the C-DRX counter to deactivate the SCG. At operation S704a, the method includes deactivating the SCG in response to detecting that the SCG deactivation criteria is met. At operation S706a, the method includes sending the command to the UE (100) informing about the deactivation of the SCG by the network node (200). At operation S708a, the method includes detecting whether the SCG reactivation criteria is met. At operation S710a, the method includes sending the command to the UE (100) to reactivate the deactivated SCG by the network node (200). At operation S712a, the method includes receiving the indication from the UE (100) to indicate about the reactivation of the deactivated SCG by the UE (100). At operation S714a, the method includes reactivating the deactivated SCG in response to detecting that the SCG reactivation criteria is met at the network node (200). At operation S716a, the method includes sending the indication to the UE (100) to indicate about the reactivation of the SCG by the network node (200).

Figure 7B:
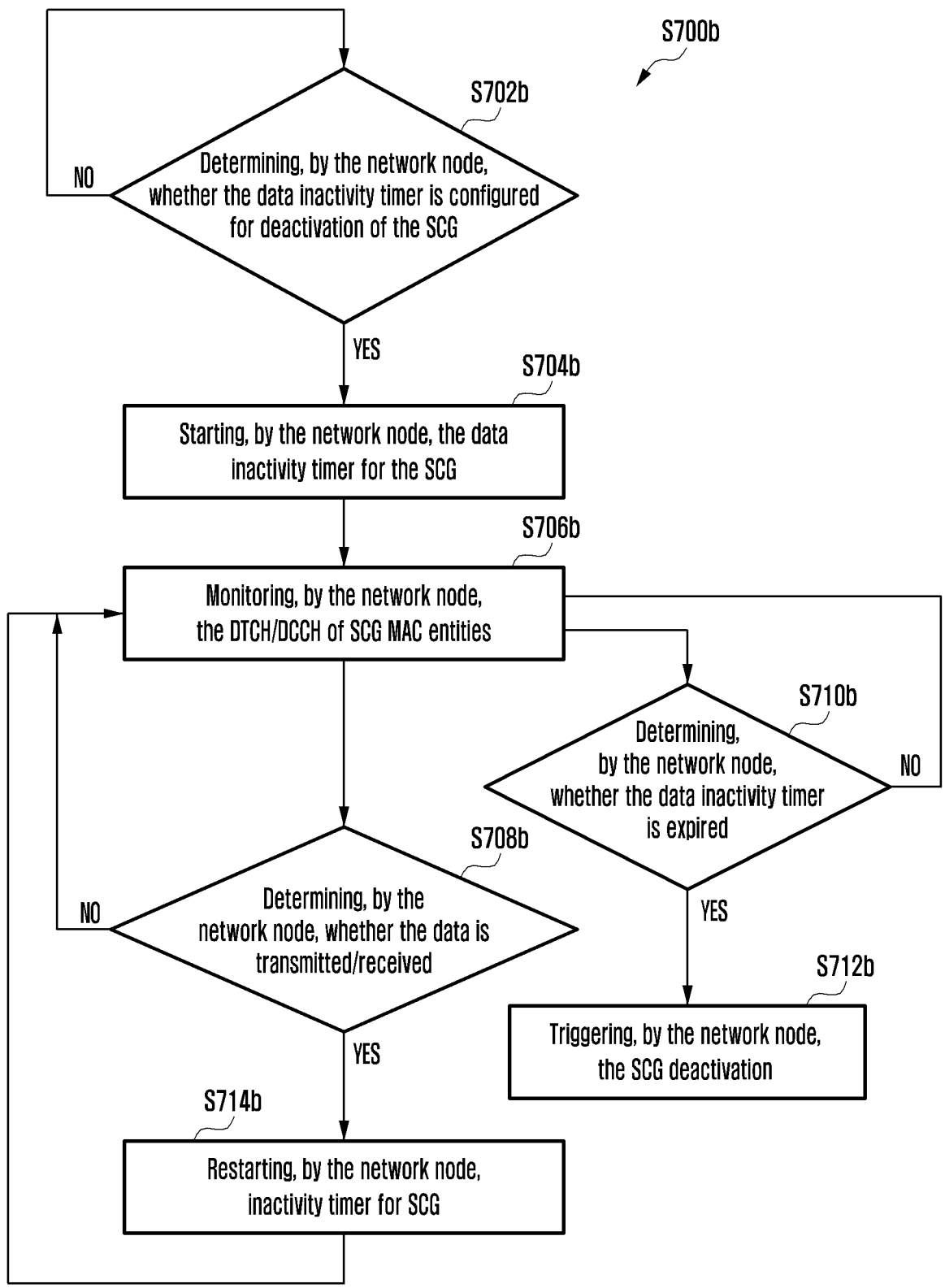
FIG. 7B is an example flow chart illustrating a method, implemented by a UE, for triggering an SCG deactivation based on a data inactivity timer, according to an embodiment of the disclosure.

FIG. 7B is an example flow chart illustrating a method, implemented by a UE, for triggering an SCG deactivation based on a data inactivity timer, according to an embodiment of the disclosure.

Referring to FIG. 7B, in a method S700b, the operations S702b-S714b are performed by the SCG deactivation-reactivation controller (240).

At operation S702b, the method includes determining whether the data inactivity timer is configured for deactivation of the SCG. If the data inactivity timer is not configured for deactivation of the SCG then, the method again performs the operation S702b. If the data inactivity timer is configured for the deactivation of the SCG then, at operation S704b, the method includes starting the data inactivity timer for the SCG. At operation S706b, the method includes monitoring the DTCH/DCCH of CCG MAC entities. At operation S708b, the method includes determining whether the data is transmitted/received at the UE (100). If the data is transmitted/received at the UE (100) then, at operation S714b, the method includes restarting the data inactivity timer for the SCG. If the data is not transmitted/received at the UE (100) then, the method again performs the operation S706b. At operation S710b, the method includes determining whether the data inactivity timer is expired. If the data inactivity timer is not expired then, at operation S706b, the method includes monitoring the DTCH/DCCH of CCG MAC entities. If the data inactivity timer is expired then, at operation S712b, the method includes triggering the SCG deactivation.

Figure 7C:
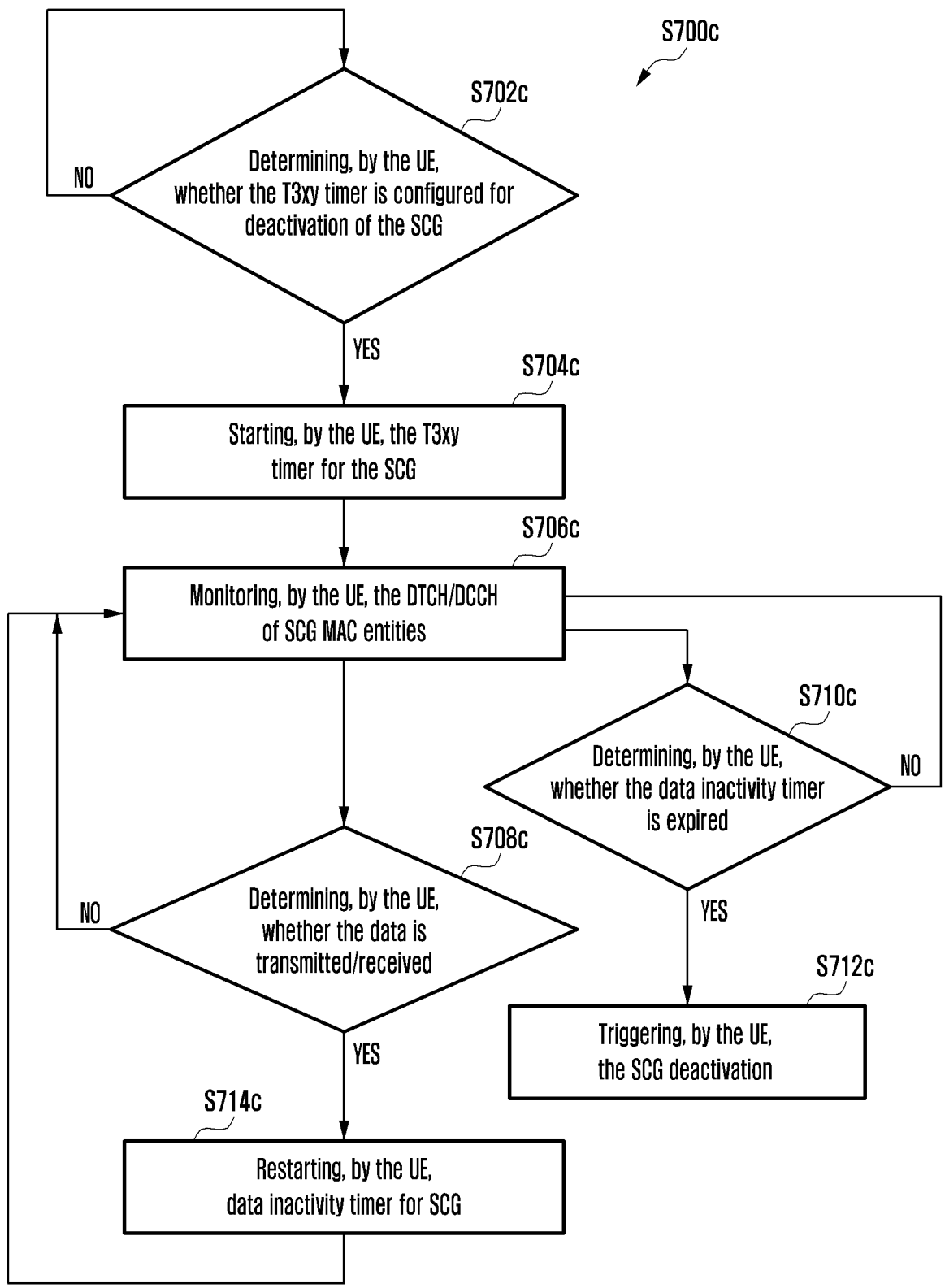
FIG. 7C is an example flow chart illustrating a method, implemented by a UE, for triggering an SCG deactivation based on a T3xy timer, according to an embodiment of the disclosure.

FIG. 7C is an example flow chart illustrating a method, implemented by a network node, for triggering an SCG deactivation based on a T3xy timer, according to an embodiment of the disclosure.

Referring to FIG. 7C, in a method S700c, the operations S702c-S714c are performed by the SCG deactivation-reactivation controller (240).

At operation S702c, the method includes determining whether the T3xy timer is configured for deactivation of the SCG. If the T3xy timer is not configured for deactivation of the SCG then, the method again performs the operation S702c. If the T3xy timer is configured for the deactivation of the SCG then, at operation S704c, the method includes starting the T3xy timer for the SCG. At operation S706c, the method includes monitoring the DTCH/DCCH of CCG MAC entities. At operation S708c, the method includes determining whether the data is transmitted/received at the UE (100). If the data is transmitted/received at the UE (100) then, at operation S714c, the method includes restarting the T3xy timer for the SCG. If the data is not transmitted/received at the UE (100) then, the method again performs the operation S706c. At operation S710c, the method includes determining whether the T3xy timer is expired. If the T3xy timer is not expired then, at operation S706c, the method includes monitoring the DTCH/DCCH of CCG MAC entities. If the T3xy timer is expired then, at operation S712c, the method includes triggering the SCG deactivation.

Figure 7D:
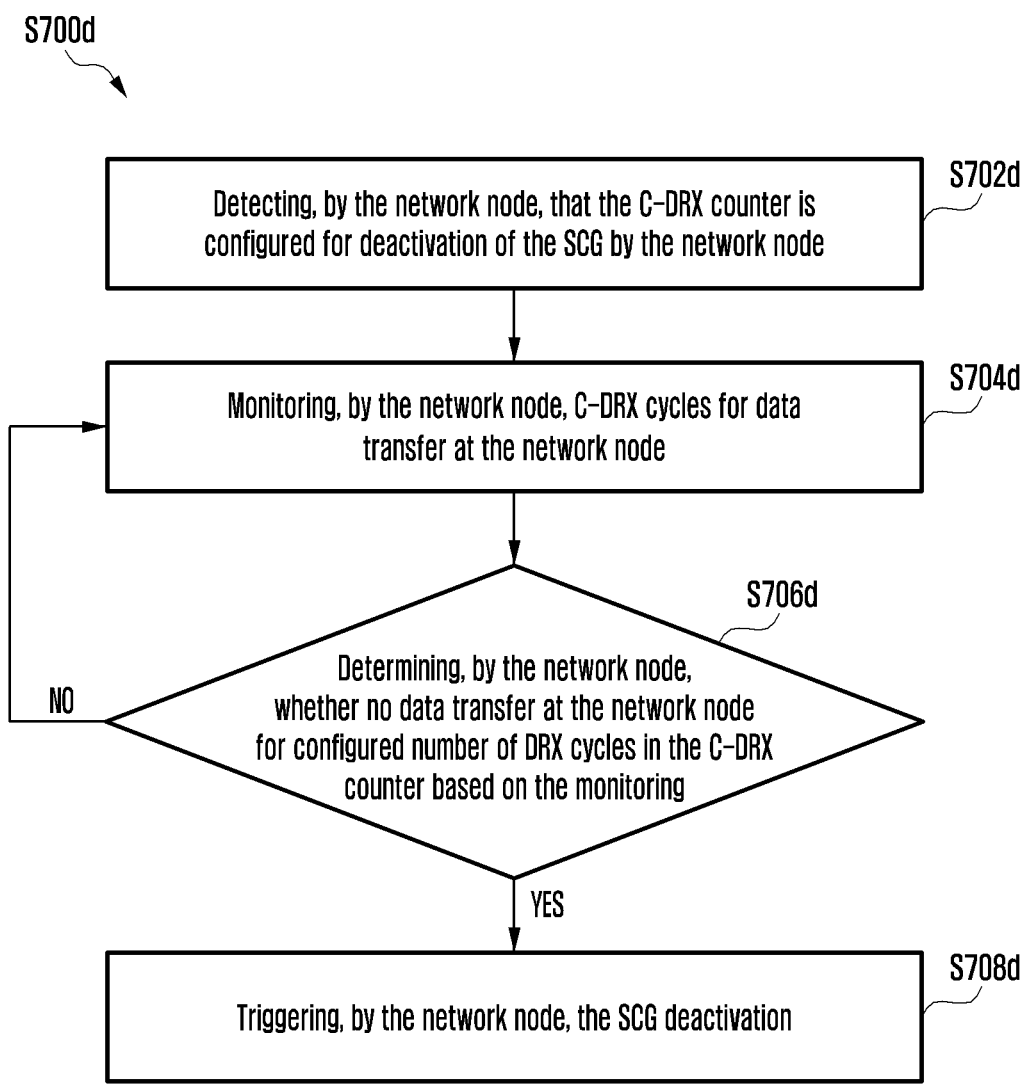
FIG. 7D is an example flow chart illustrating a method, implemented by a UE, for triggering an SCG deactivation based on a C-DRX counter, according to an embodiment of the disclosure.

FIG. 7D is an example flow chart illustrating a method, implemented by a network node (200), for triggering an SCG deactivation based on a C-DRX counter, according to an embodiment of the disclosure.

Referring to FIG. 7D, in a method S700c, the operations S702d-S708d are performed by the SCG deactivation-reactivation controller (240).

At operation S702d, the method includes detecting that the C-DRX counter is configured for deactivation of the SCG. At operation S704d, the method includes monitoring the C-DRX cycles for data transfer at the UE (100). At operation S706d, the method includes determining whether no data transfer at the UE (100) for configured number of DRX cycles in the C-DRX counter based on the monitoring. If no data transfer at the UE (100) for configured number of DRX cycles in the C-DRX counter then, at operation S708d, the method includes triggering the SCG deactivation. If data is transferred at the UE (100) for configured number of DRX cycles in the C-DRX counter then, at operation S704d, the method includes monitoring the C-DRX cycles for data transfer at the UE (100).

Figure 8:
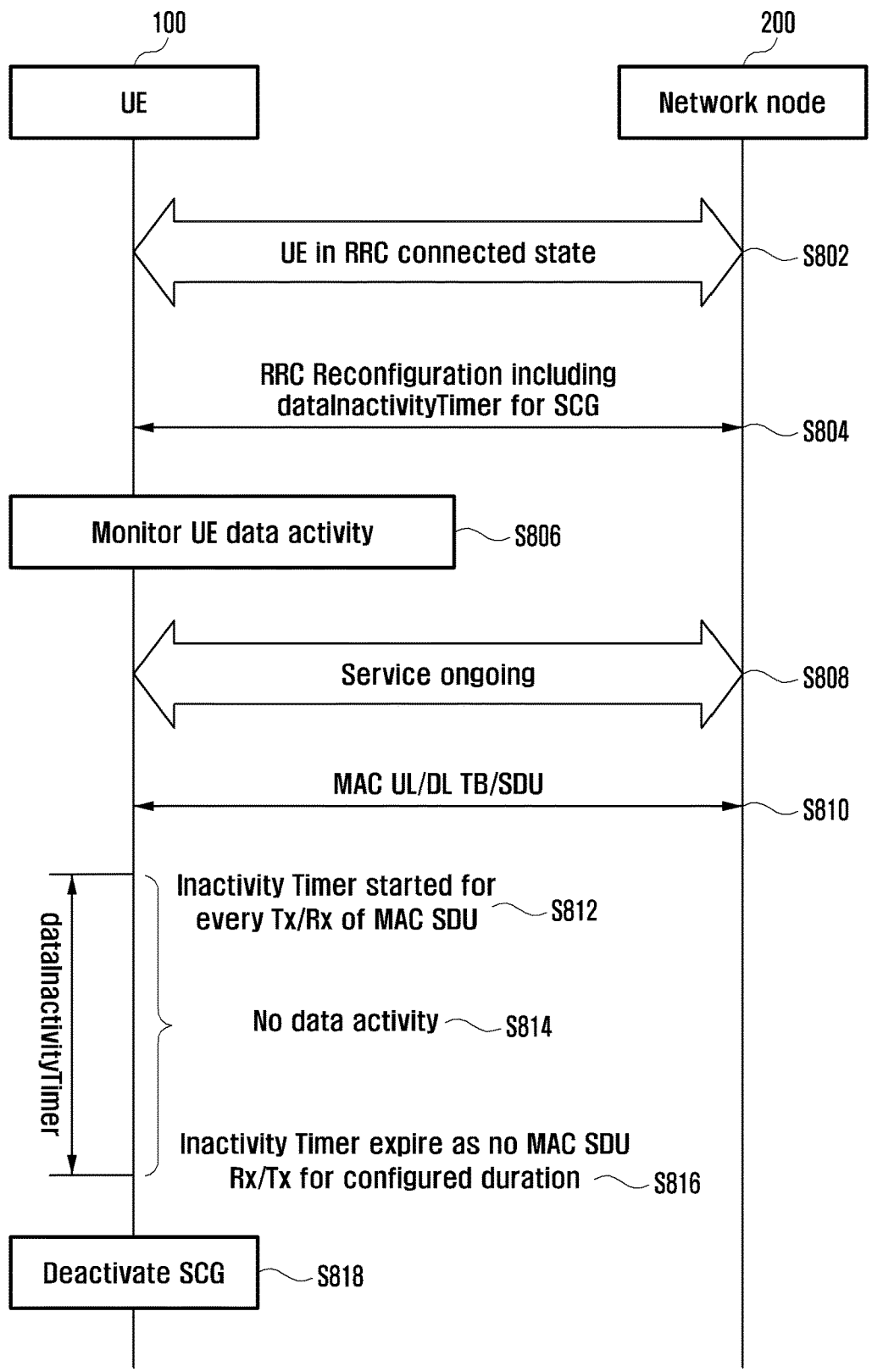
FIG. 8 is a signaling diagram illustrating a scenario of a proposed SCG deactivation based on data inactivity timer, according to an embodiment of the disclosure.

FIG. 8 is a signaling diagram illustrating a scenario of a proposed SCG deactivation based on a data inactivity timer, according to an embodiment of the disclosure.

Referring to FIG. 8, in current 3GPP TS 38.331 specification, the UE (100) can be configured with a dataInactivityTimer functionality to monitor its data activity. A MAC layer is responsible for monitoring this data activity. Upon expiry of this timer, the UE (100) autonomously enters RRC IDLE state i.e., an RRC release message from the gNB is not required. This timer can be extended in functionality in order to trigger deactivation of SCG. However, the current specification provision this timer can only be configured on MCG but monitors per UE data activity and not per cell group data activity i.e., dataInactivityTimer is (re)started for data activity is any of its configured cell groups.

The UE (100) that supporting the SCG deactivation can be configured with dataInactivityTimer such that the network (1000) can indicate that dataInactivityTimer is for the purpose of SCG deactivation. If dataInactivityTimer is configured as SCG specific, then the UE (100) monitor data activity on the SCG MAC based on this timer. When the new MAC SDU is either transmitted or received, this dataInactivityTimer is started. If the dataInactivityTimer is configured via an RRC message over MCG, then the response message is carried over MCG itself. Therefore, there is no uplink response message (to the RRC reconfiguration message that signaled configuration of SCG dataInactivityTimer) sent over the SCG. This leads to a possibility that the SCG does not have any subsequent data and therefore the dataInactivityTimer is never started at all.

Therefore, it is required that the dataInactivityTimer is also started upon receiving the RRC reconfiguration message that signaled the configuration of this timer. Upon expiry, the MAC sends indication to RRC that the dataInactivityTimer for the SCG has expired. The RRC on identifying that the dataInactivityTimer expiry indication from MAC belongs to SCG, RRC deactivates the SCG instead of releasing the RRC connection. In an embodiment, the network (1000) can configure the dataInactivityTimer specific to SCG. In another embodiment, the dataInactivityTimer is started at every transmission of reception of a MAC SDU or transport block. In another embodiment, the dataInactivityTimer is started upon configuration of this timer. In another embodiment, the expiry of dataInactivityTimer associated to SCG leads to deactivation of the corresponding SCG.

Further, the set of procedures involved at the UE (100) for deactivation of SCG upon expiry of dataInactivityTimer for SCG is as illustrated below—

//Configuration of dataInactivityTimer (TS 38.331):

An example of Configuration of dataInactivityTimer is as following Table 1.

TABLE 1

```
MAC-CellGroupConfig ::=    SEQUENCE {
    drx-Config        SetupRelease { DRX-Config }         OPTIONAL,
-- Need M
    schedulingRequestConfig                SchedulingRequestConfig
OPTIONAL, -- Need M
    bsr-Config        BSR-Config                OPTIONAL, -- Need
M
    tag-Config        TAG-Config                OPTIONAL, -- Need
M
    phr-Config        SetupRelease { PHR-Config }         OPTIONAL,
-- Need M
    skipUplinkTxDynamic    BOOLEAN,
    ...,
    [[
    csi-Mask           BOOLEANOPTIONAL, -- Need M
    dataInactivityTimer        SetupRelease { DataInactivityTimer }
OPTIONAL-- Cond MCG-Only
    ]],
    [[
    usePreBSR-r16      ENUMERATED {true}         OPTIONAL,
-- Need R
    schedulingRequestID-LBT-SCell-r16            SchedulingRequestId
OPTIONAL, -- Need M
    lch-BasedPrioritization-r16            ENUMERATED    {enabled}
OPTIONAL, -- Need R
    schedulingRequestID-BFR-SCell-r16            SchedulingRequestId
OPTIONAL, -- Need R
    drx-ConfigSecondaryGroup-r16            SetupRelease    { DRX-
ConfigSecondaryGroup }        OPTIONAL-- Need M
    ]],
    [[
    dataInactivityTimer-r16        SetupRelease ( DataInactivityTimer }
OPTIONAL -- Cond SCG-Deactivate
    ]]
}
DataInactivityTimer ::=    ENUMERATED {s1, s2, s3, s5, s7, s10, s15, s20, s40, s50,
s60, s80, s100, s120, s150, s180}
```

TABLE 1-continued

| Conditional Presence | Explanation |
|---|---|
| MCG-Only | This field is optionally present, Need M, for the MAC-CellGroupConfig of the MCG. It is absent otherwise. |
| SCG-Deactivate | This field is optionally present, Need M, for the UE if SCG deactivate is supported. It is absent otherwise. |

//Monitoring of Data Inactivity (TS 38.321):

Data inactivity monitoring: The UE (100) may be configured by RRC with a Data inactivity monitoring functionality, when in RRC_CONNECTED. RRC controls Data inactivity operation by configuring the timer dataInactivityTimer.

When dataInactivityTimer is configured the UE (100) shall:

1> if the UE (100) supports SCG deactivation and dataInactivityTimer-r17 is configured:

*2> if MAC entity of the SCG receives a MAC SDU for DTCH logical channel, DCCH logical channel, or CCCH logical channel;

**3> start or restart dataInactivityTimer-r17.

1> else:

*2> if any MAC entity receives a MAC SDU for DTCH logical channel, DCCH logical channel, or CCCH logical channel; or

*2> if any MAC entity transmits a MAC SDU for DTCH logical channel, or DCCH logical channel, regardless of LBT failure indication from lower layers:

**3> start or restart dataInactivityTimer.

1> if the dataInactivityTimer expires:

*2> indicate the expiry of the dataInactivityTimer to upper layers.

1> if dataInactivityTimer-r17 expires:

*2> indicate the expiry of the dataInactivityTimer-r17 to upper layers

//Actions Upon Expiry:

The UE (100) actions upon the expiry of DataInactivityTimer

Upon receiving the expiry of DataInactivityTimer from lower layers while in RRC_CONNECTED, the UE (100) shall:

1> perform the actions upon going to RRC_IDLE as specified in 5.3.11, with release cause 'RRC connection failure'.

A UE (100) actions upon the expiry of DataInactivityTimer-r17

Upon receiving the expiry of DataInactivityTimer-r17 from lower layers while in RRC_CONNECTED, the UE (100) shall:

1> perform the actions for deactivating SCG as specified.

In an embodiment, a UE (100) actions upon the expiry of DataInactivityTimer-r17

Upon receiving the expiry of DataInactivityTimer-r17 from lower layers while in RRC_CONNECTED, the UE (100) shall:

1> perform the actions for releasing SCG as specified.

As shown in the FIG. 8, At operation S802, the UE (100) is in the RRC connected state with the network node (200). At operation S804, the network node (200) sends the RRC reconfiguration including the data inactivity timer for the SCG. At operation S806, the UE (100) monitors the UE data activity. At operation S808, the service ongoing is between the UE (100) and the network node (200). At operation S810, the MAC UL/DL TB/SDU is between the UE (100) and the network node (200). At operation S812, the UE (100) starts the inactivity timer for every Tx/Rx of MAC SDU. At operation S814, the UE (100) determines that no data activity at the UE (100). At operation S816, the data inactivity timer expires as no MAC SDU Rx/Tx for configured duration. At operation S818, the UE (100) deactivates the SCG.

Figure 9:
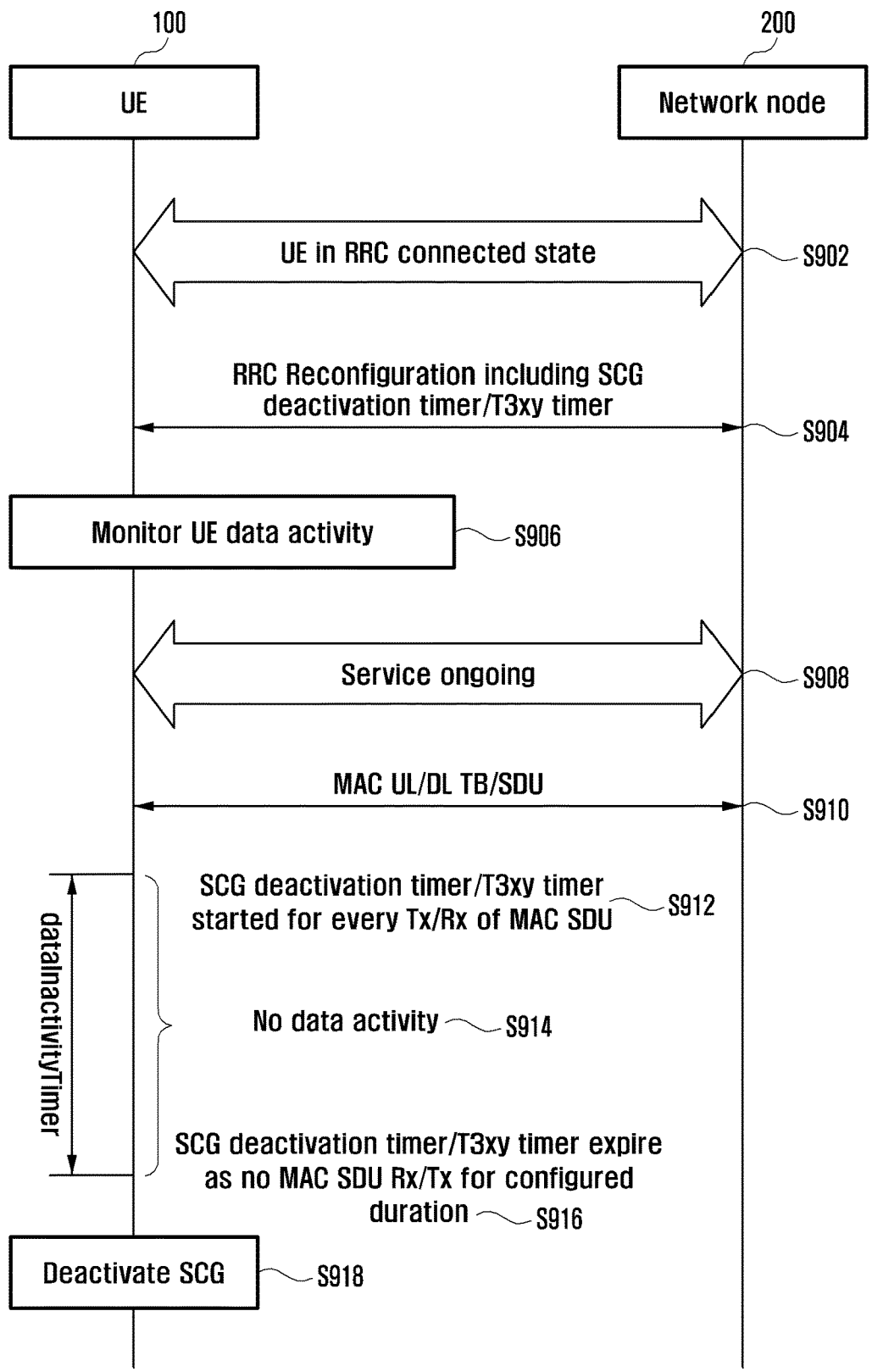
FIG. 9 is a signaling diagram illustrating a scenario of deactivation of an SCG upon expiry of an SCG deactivation timer, according to an embodiment of the disclosure.

FIG. 9 is a signaling diagram illustrating a scenario of deactivation of an SCG upon expiry of an SCG deactivation timer, according to an embodiment of the disclosure.

Referring to FIG. 9, consider a proposed method, an alternative method to trigger SCG deactivation is based on the expiry of a new timer. In the proposed method, the network (1000) can configure a Timer T3xy to monitor data inactivity. The timer is started every time there is a new MAC SDU reception or transmission on the SCG MAC entity. Therefore, the data activity is monitored by the MAC, in a manner similar to that illustrated in FIG. 1, i.e., T3xy is started every time a new MAC SDU is transmitted or received, T3xy is started upon getting this timer configured, T3xy is not stopped anytime and upon T3xy expiry SCG is deactivated.

In an embodiment, a new timer is introduced to monitor data inactivity on the SCG. In another embodiment, this new timer is started upon reception or transmission of a new MAC SDU or transport block. In another embodiment, expiry of this timer is indicated from MAC to RRC. In another embodiment this new timer is started at every transmission of reception of a MAC SDU or transport block. In another embodiment, this new timer is started upon configuration of this timer. In another embodiment, the expiry of this timer triggers UE (100) autonomous deactivation of SCG. The UE (100) actions are as follows—

//Configuration of dataInactivityTimer (TS 38.331):

An example of CellGroupConfig information element is as following Table 2.

TABLE 2

```
-- ASN1START
-- TAG-CELLGROUPCONFIG-START
-- Configuration of one Cell-Group:
CellGroupConfig ::=      SEQUENCE {
    cellGroupId          CellGroupId,
    rlc-BearerToAddModList       SEQUENCE (SIZE(1..maxLC-ID)) OF
RLC-BearerConfig         OPTIONAL, -- Need N
    rlc-BearerToReleaseList      SEQUENCE (SIZE(1..maxLC-ID)) OF
```

TABLE 2-continued

```
LogicalChannelIdentity          OPTIONAL, -- Need N
  mac-CellGroupConfig           MAC-CellGroupConfig
OPTIONAL, -- Need M
  physicalCellGroupConfig       PhysicalCellGroupConfig
OPTIONAL, -- Need M
  spCellConfig       SpCellConfig       OPTIONAL, --
Need M
  sCellToAddModList       SEQUENCE (SIZE (1..maxNrofSCells)) OF
SCellConfig       OPTIONAL, -- Need N
  sCellToReleaseList       SEQUENCE (SIZE (1..maxNrofSCells)) OF
SCellIndex       OPTIONAL, -- Need N
  ..,
  [[
  reportUplinkTxDirectCurrent       ENUMERATED {true}
OPTIONAL-- Cond BWP-Reconfig
  ]],
  [[
  bap-Address-r16       BITSTRING (SIZE (10))
OPTIONAL, -- Need M
  bh-RLC-ChannelToAddModList-r16       SEQUENCE (SIZE(1..maxBH-
RLC-ChannelID-r16)) OF BH-RLC-ChannelConfig-r16 OPTIONAL, --
Need N
  bh-RLC-ChannelToReleaseList-r16       SEQUENCE (SIZE(1..maxBH-
RLC-ChannelID-r16)) OF BH-RLC-ChannelID-r16 OPTIONAL, -- Need N
  f1c-TransferPath-r16       ENUMERATED {lte, nr, both}
OPTIONAL, -- Need M
  simultaneousTCI-UpdateList1-r16       SEQUENCE (SIZE
(1..maxNrofServingCellsTCI-r16)) OF ServCellIndex OPTIONAL, --
Need R
  simultaneousTCI-UpdateList2-r16 SEQUENCE (SIZE
(1..maxNrofServingCellsTCI-r16)) OF ServCellIndex OPTIONAL, --
Need R
  simultaneousSpatial-UpdatedList1-r16 SEQUENCE (SIZE
(1..maxNrofServingCellsTCI-r16)) OF ServCellIndex OPTIONAL, --
Need R
  simultaneousSpatial-UpdatedList2-r16 SEQUENCE (SIZE
(1..maxNrofServingCellsTCI-r16)) OF ServCellIndex OPTIONAL, --
Need R
  uplinkTxSwitchingOption-r16       ENUMERATED {switchedUL,
dualUL}       OPTIONAL -- Need R
  ]],
  [[
  T3xy-r17    ENUMERATED {s1, s2, s3, s5, s7, s10, s15, s20, s40, s50, s60, s80,
s100, s120, s150, s180}    OPTIONAL -- Cond SCG-Deactivate
  ]]
}
```

| Conditional Presence | Explanation |
|---|---|
| SCG-Deactivate | This field is optionally present, Need M, for the UE if SCG deactivate is supported. It is absent otherwise. |

//Monitoring of Data Inactivity (TS 38.321):

Data inactivity monitoring: The UE (100) may be configured by RRC with a Data inactivity monitoring functionality, when in RRC_CONNECTED. RRC controls Data inactivity operation by configuring the timer dataInactivityTimer.

When T3xy is configured the UE (100) shall:

1> if the UE (100) supports SCG deactivation and T3xy is configured:

*2> if the MAC entity of the SCG receives a MAC SDU for DTCH logical channel, DCCH logical channel, or CCCH logical channel;

**3> start or restart T3xy.

1> else:

*2> if any MAC entity receives a MAC SDU for DTCH logical channel, DCCH logical channel, or CCCH logical channel; or

*2> if any MAC entity transmits a MAC SDU for DTCH logical channel, or DCCH logical channel, regardless of LBT failure indication from lower layers:

**3> start or restart dataInactivityTimer.

1> if the dataInactivityTimer expires:

*2> indicate the expiry of the dataInactivityTimer to upper layers.

1> if T3xy expires:

*2> indicate the expiry of the T3xy to upper layers.

//Actions Upon Expiry:

The UE actions upon the expiry of DataInactivityTimer. Upon receiving the expiry of DataInactivityTimer from lower layers while in RRC_CONNECTED, the UE shall:

1> perform the actions upon going to RRC_IDLE as specified, with release cause 'RRC connection failure'.

The UE actions upon the expiry of T3xy: Upon receiving the expiry of T3xy from lower layers while in RRC_CONNECTED, the UE shall:

1> perform the actions for deactivating SCG as specified.

In an embodiment, the UE actions upon the expiry of T3xy: Upon receiving the expiry of T3xy from lower layers while in RRC_CONNECTED, the UE shall: 1> perform the actions for releasing SCG as specified As shown in the FIG. 9, at operation S902, the UE (100) is in the RRC connected state with the network node (200). At operation S904, the network node (200) sends the RRC reconfiguration including the SCG deactivation timer/T3xy timer for the SCG. At operation S906, the UE (100) monitors the UE data activity. At operation S908, the service ongoing is between the UE (100) and the network node (200). At operation S910, the MAC UL/DL TB/SDU is between the UE (100) and the network node (200). At operation S912, the UE (100) starts the SCG deactivation timer/T3xy timer for every Tx/Rx of MAC SDU. At operation S914, the UE (100) determines that no data activity at the UE (100). At operation S916, the SCG deactivation timer/T3xy timer expires as no MAC SDU Rx/Tx for configured duration. At operation S918, the UE (100) deactivates the SCG.

Figure 10:
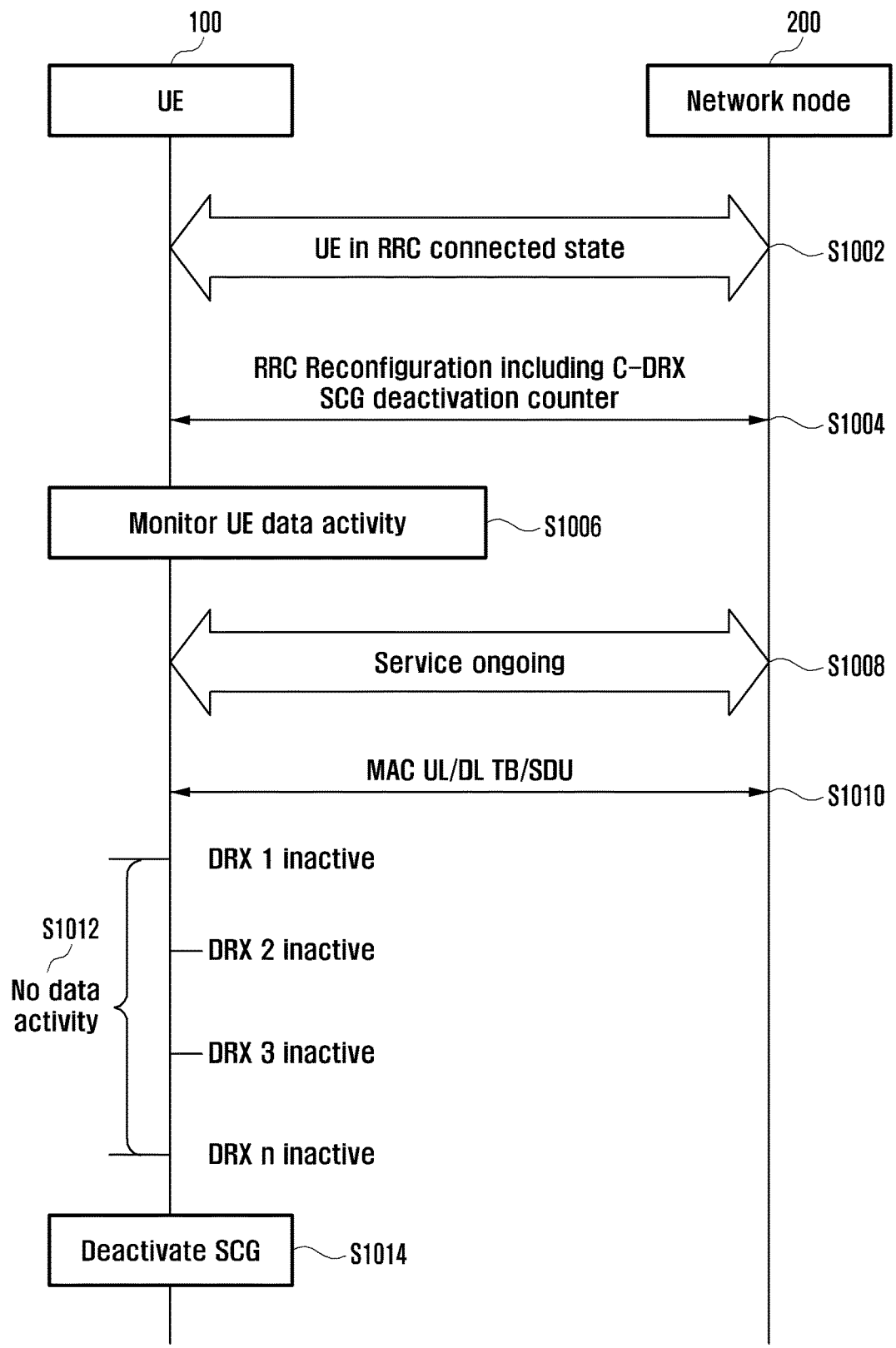
FIG. 10 is a signaling diagram illustrating a proposed deactivation of an SCG upon fulfilling data inactivity C-DRX counts, according to an embodiment of the disclosure.

FIG. 10 is a signaling diagram illustrating proposed deactivation of an SCG upon fulfilling data inactivity C-DRX counts, according to an embodiment of the disclosure.

Referring to FIG. 10, consider a proposed method, the data activity or data inactivity can be monitored based on a count of the number times a certain event occurs. In this method, the data inactivity monitoring and subsequent SCG deactivation is done based a configured count value being fulfilled. The network (1000) configures the UE (100) with a number of allowed inactive occasions.

Upon fulfilling this number of inactive occasions, the UE (100) triggers deactivation of a configured SCG. In this method, the network node (200) configures the UE (100) with long C-DRX or short-DRX. In addition to the configurations present in the current specification 3GPP TS 38.331, the network additionally provides a count value for monitoring data inactivity e.g., drxInactivityCounter. If the number of DRX cycles over which there has been no data activity on MAC layer becomes equal to or larger than this configured drxInactivityCounter, the UE (100) triggers SCG deactivation. For instance, if network configures a drxInactivityCounter as 2 counts, the UE (100) deactivates SCG if there is no activity in uplink or downlink for duration of 2 C-DRX cycles.

If there is more than one C-DRX configured on the SCG, then fulfilling the counter value for either of them also leads to deactivation of SCG. In an embodiment, the SCG is deactivated based on the UE (100) fulfilling a network configured counter. In another embodiment, the network RAN node configures the number of connected state DRX cycles for which the UE (100) has to monitor for data activity or data inactivity. In another embodiment, the UE (100) triggers deactivation of SCG upon determining data inactivity over a configured number of successive connected state DRX cycles. The UE actions are illustrated below (values and variable names are for illustration purpose)—
//Counter Configuration from Network An example of Counter configuration is as following Table 3.

TABLE 3

```
-- ASN1START
-- TAG-MAC-CELLGROUPCONFIG-START
MAC-CellGroupConfig ::=    SEQUENCE {
    drx-Config        SetupRelease { DRX-Config }         OPTIONAL,
-- Need M
    schedulingRequestConfig                    SchedulingRequestConfig
OPTIONAL, -- Need M
    bsr-Config       BSR-Config              OPTIONAL, -- Need M
    tag-Config       TAG-Config              OPTIONAL, -- Need
M
    phr-Config       SetupRelease { PHR-Config }         OPTIONAL,
-- Need M
    skipUplinkTxDynamic     BOOLEAN,
    ...,
    [[
    csi-Mask         BOOLEANOPTIONAL, -- Need M
    dataInactivityTimer         SetupRelease { DataInactivityTimer }
OPTIONAL-- Cond MCG-Only
    ]],
    [[
    usePreBSR-r16      ENUMERATED {true}           OPTIONAL,
-- Need R
    schedulingRequestID-LBT-SCell-r16            SchedulingRequestId
OPTIONAL, -- Need M
    lch-BasedPrioritization-r16            ENUMERATED {enabled}
OPTIONAL, -- Need R
    schedulingRequestID-BFR-SCell-r16            SchedulingRequestId
OPTIONAL, -- Need R
    drx-ConfigSecondaryGroup-r16          SetupRelease   { DRX-
ConfigSecondaryGroup }        OPTIONAL-- Need M
    ]],
    [[
    drxInactivityCounter       SetupRelease { DRX-InactivityCounter }
OPTIONAL, -- Cond SCG-Deactivate
    ]],
}
```

TABLE 3-continued

DataInactivityTimer ::= ENUMERATED {s1, s2, s3, s5, s7, s10, s15, s20, s40, s50, s60, s80, s100, s120, s150, s180}
DRX-InactivityCounter::= ENUMERATED {c2, c5, c10, c20, c35, c50, spare1, spare}
-- TAG-MAC-CELLGROUPCONFIG-STOP
-- ASN1STOP MAC-Cell GroupConfigfield descriptions drxInactivityCounter
The number of inactive C-DRX cycles upon which SCG is deactivated.
If configured for a UE supporting deactivation of SCG, SCG is deactivated upon data inactivity over consecutive C-DRX cycles as configured in drxInactivityCounter.
The value c2 means 2 consecutive C-DRX cycles, the value c5 means 5 consecutive C-DRX cycles and so on.

Conditional
Presence     Explanation

SCG-Deactivate  This field is optionally present, Need M, for the UE if SCG deactivate is supported. It is It is absent otherwise.

---

As shown in the FIG. 10, at operation S1002, the UE (100) is in the RRC connected state with the network node (200). At operation S1004, the network node (200) sends the RRC reconfiguration including the C-DRX SCG deactivation counter for the SCG. At operation S1006, the UE (100) monitors the UE data activity. At operation S1008, the service ongoing is between the UE (100) and the network node (200). At operation S1010, the MAC UL/DL TB/SDU is between the UE (100) and the network node (200). At operation S1012, the UE (100) determines that no data activity at the UE (100). At operation S1014, the UE (100) deactivates the SCG.

Figure 11:
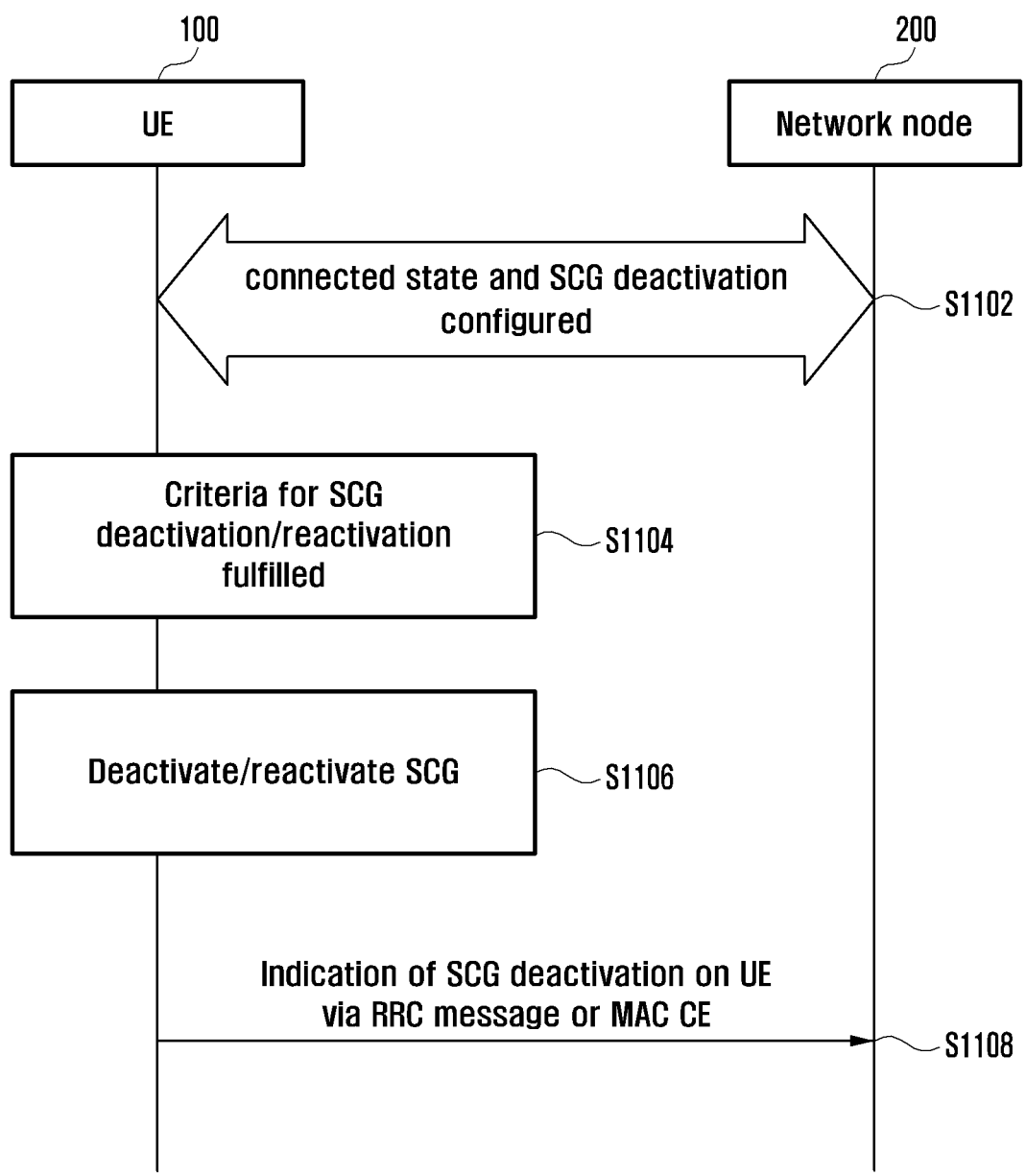
FIG. 11 is a signaling diagram illustrating a scenario of indication from a UE to a network about a UE autonomous SCG deactivation, according to an embodiment of the disclosure.

FIG. 11 is a signaling diagram illustrating a scenario of indication from a UE to a network node about a UE autonomous SCG deactivation, according to an embodiment of the disclosure.

Referring to FIG. 11, consider a proposed method, the above embodiments explain methods wherein the UE (100) evaluates certain events and triggers the deactivation autonomously i.e., without explicit network command. However, if this deactivation is not indicated to the network, then the gNB (i.e., network node 200) may continue allocating resources to the UE (100) or even eventually misinterpret that the UE (100) has undergone a failure as there is no uplink activity from the UE (100). This necessitates the need for UE (100) to indicate to the serving secondary gNB about the deactivation of SCG. This may be done in several ways:

As a new IE in an existing RRC message e.g., in UE assistance information message, ULInformationTransfer-MRDC, failureInforamtion etc.

As a new MAC CE, as illustrated below
//New MAC CE for SCG Deactivation
Deactivation/Reactivation of Secondary Cell Group The UE (100) may deactivate and reactivate the configured secondary cell group by sending the SCG deactivation/reactivation MAC CE as indicated.

The MAC entity shall:
1> if the MAC entity receives indication of deactivation of SCG:
*2> indicate to lower layers the information regarding the SCG deactivation/reactivation MAC CE.
//Mac Ce Format:
SCG Deactivation/Reactivation MAC CE: The SCG Deactivation is identified by a MAC subheader with LCID as specified in Table 6.2.1-1. It has a fixed size of 16 bits with following fields:

D/A: This field indicates if the MAC CE is triggered for UE autonomous deactivation or reactivation of SCG
R: Reserved bit, set to 0
C: Cell id. In this release, this is always for SCG.

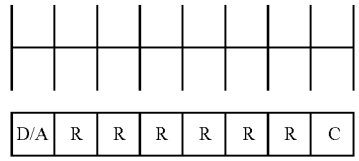

Or:
SCG Deactivation/Reactivation MAC CE: The SCG Deactivation is identified by a MAC subheader with LCID as specified in Table 6.2.1-1. It has a fixed size of 16 bits with following fields:
D/A: This field indicates if the MAC CE is triggered for UE autonomous deactivation or reactivation of SCG
R: Reserved bit, set to 0

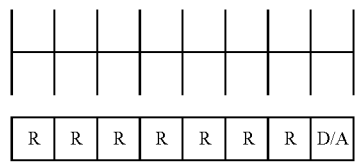

In an embodiment, the SCG is autonomously deactivated by the UE (100) and this is indicated to the network node (200). In another embodiment, SCG deactivation indication is sent as part of RRC message or a MAC control element. In another embodiment, MAC CE or RRC message can be used to indicate the network node (200) about UE autonomous reactivation of a SCG which was earlier in deactivated state. In another embodiment, the network node (200) can configure the SCG to start in de-active state to later be activated by UE (100) using the RRC message or the MAC CE. Since SCG is already deactivated on the UE (100), the MAC entity is SCG cannot be used for active transmission of this indication. Therefore, one of the following approaches are possible:

MAC entity of SCG is suspended only after transmission of SCG deactivation indication, or The SCG deactivation indication is sent over MCG In an embodiment, the SCG id deactivated after sending SCG deactivation over the SCG MAC. In another embodiment, the SCG deactivation indication is sent over MCG. Further, there are several bearers and bearer types that may be configured to the UE (100). Therefore, the below rules shall apply:

For RRC based indication, If SRB3 is configured for the UE (100), and SRB3 is not configured as a split SRB, then SCG deactivation indication is sent over SRB1

For RRC based indication, if SRB3 is configured for UE (100) as a split SRB, then SCG deactivation indication is sent over SRB3 (i.e., if SCG MAC is suspended, then this indication is sent on MCG leg of SRB3. IF SCG MAC is suspended only after this indication to gNB, then this indication can be sent over either MCG leg or SCG leg of SRB3.

For RRC based indication, if SRB3 is not configured to the UE (100), then this SCG deactivation indication is sent over SRB1 to the gNB.

In an embodiment, the SCG deactivation indication is sent over SRB1 if SRB3 is not configured as a split bearer. In another embodiment, the SCG deactivation indication is sent over SRB3 if SRB3 is configured as a split bearer or if SRB3 is available and MCG MAC is deactivated after sending SCG deactivation indication.

At operation S1102, the UE (100) is in the connected state with the network node (200) and the SCG deactivation is configured. At operation S1104, the criteria for the SCG deactivation/reactivation is fulfilled at the UE (100). At operation S1106, the UE (100) deactivates/reactivates the SCG. At operation S1108, the UE (100) sends the indication of the SCG deactivation on the UE (100) via the RRC message or the MAC CE.

Figure 12:
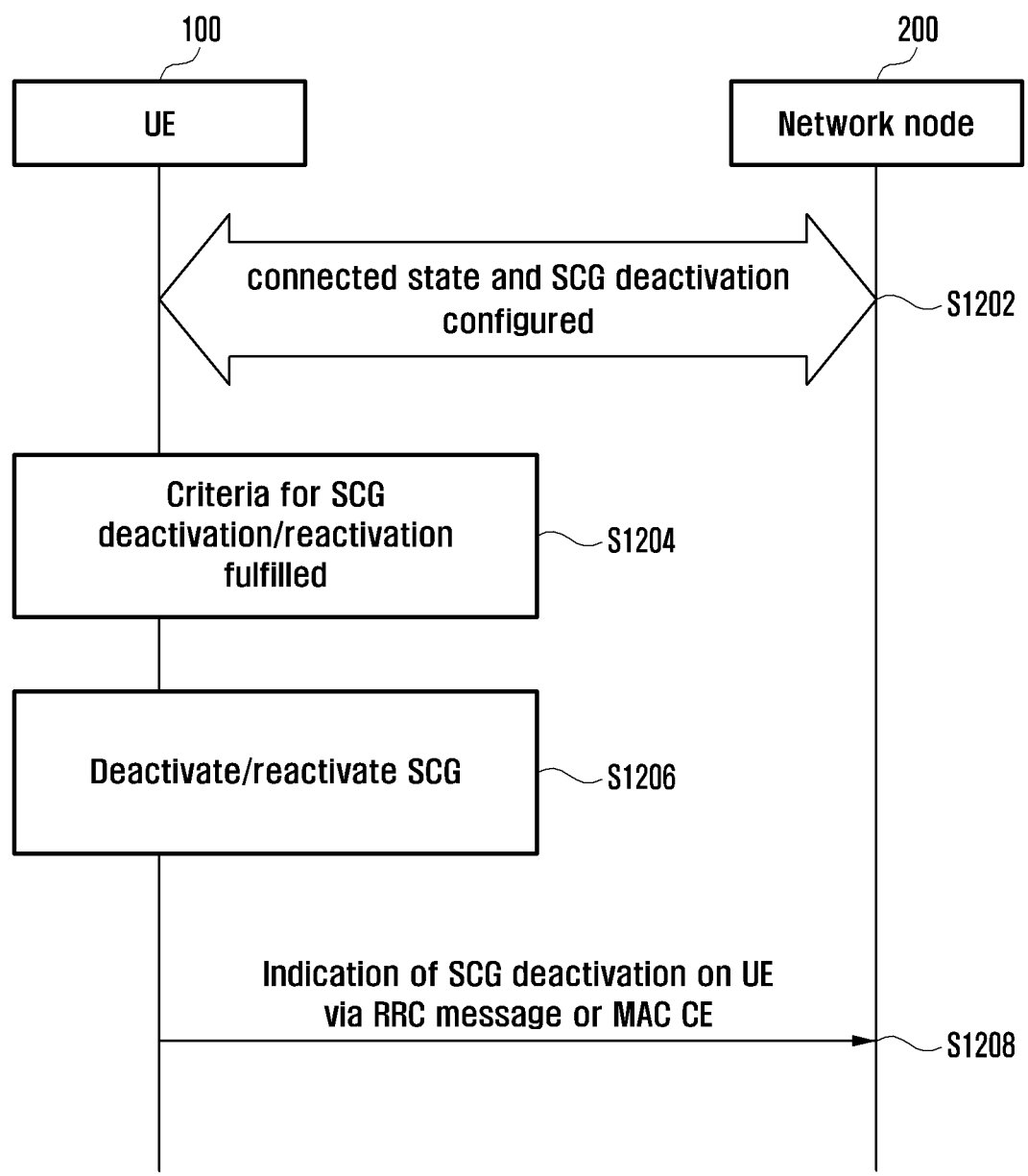
FIG. 12 is a signaling diagram illustrating a scenario of indication from a gNB to a UE to deactivate/reactive a configured SCG, according to an embodiment of the disclosure.

FIG. 12 is a signaling diagram illustrating a scenario of indication from a gNB to a UE to deactivate/reactive a configured SCG, according to an embodiment of the disclosure.

Referring to FIG. 12, consider a proposed method, an alternative approach is that the deactivation of SCG is controlled by the network node (200) and the indication is sent to the UE (100). In this method, there is no UE autonomous procedure to trigger the deactivation of SCG, and no uplink signaling from UE to indicate deactivation of SCG. This may be done in several ways:

As a new IE in an existing RRC message e.g., RRC reconfiguration message

As a new MAC CE, as illustrated below

Deactivation/Reactivation of Secondary Cell Group: The UE may deactivate and reactivate the configured secondary cell group by sending the SCG deactivation/reactivation MAC CE as indicated. The MAC entity shall:

1> if the MAC entity receives indication of deactivation of SCG:

*2> indicate to lower layers the information regarding the SCG deactivation/reactivation MAC CE.
//MAC CE Format:

SCG Deactivation/Reactivation MAC CE: The SCG Deactivation is identified by a MAC subheader with LCID as specified in Table 6.2.1-1. It has a fixed size of 16 bits with following fields:

D/A: This field indicates if the MAC CE is for deactivation or reactivation of SCG R: Reserved bit, set to 0

C: Cell id. In this release, this is always for SCG.

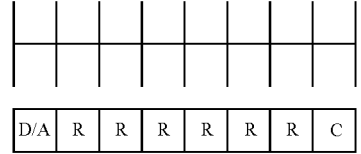

Or:

SCG Deactivation/Reactivation MAC CE: The SCG Deactivation is identified by a MAC subheader with LCID as specified in Table 6.2.1-1. It has a fixed size of 16 bits with following fields:

D/A: This field indicates if the MAC CE is for deactivation or reactivation of SCG R: Reserved bit, set to 0

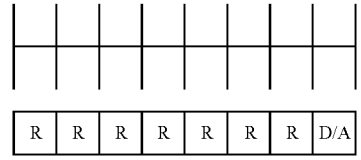

In an embodiment, the SCG is autonomously deactivated by the UE (100) and this is indicated to the network (1000).

At operation S1202, the UE (100) is in the connected state with the network node (200) and the SCG deactivation is configured. At operation S1204, the criteria for the SCG deactivation/reactivation is fulfilled at the network node (200). At operation S1206, the network node (200) deactivates/reactivates the SCG. At operation S1208, the network node (200) sends the indication of the SCG deactivation on the UE (100) via the RRC message or the MAC CE.

Figure 13A:
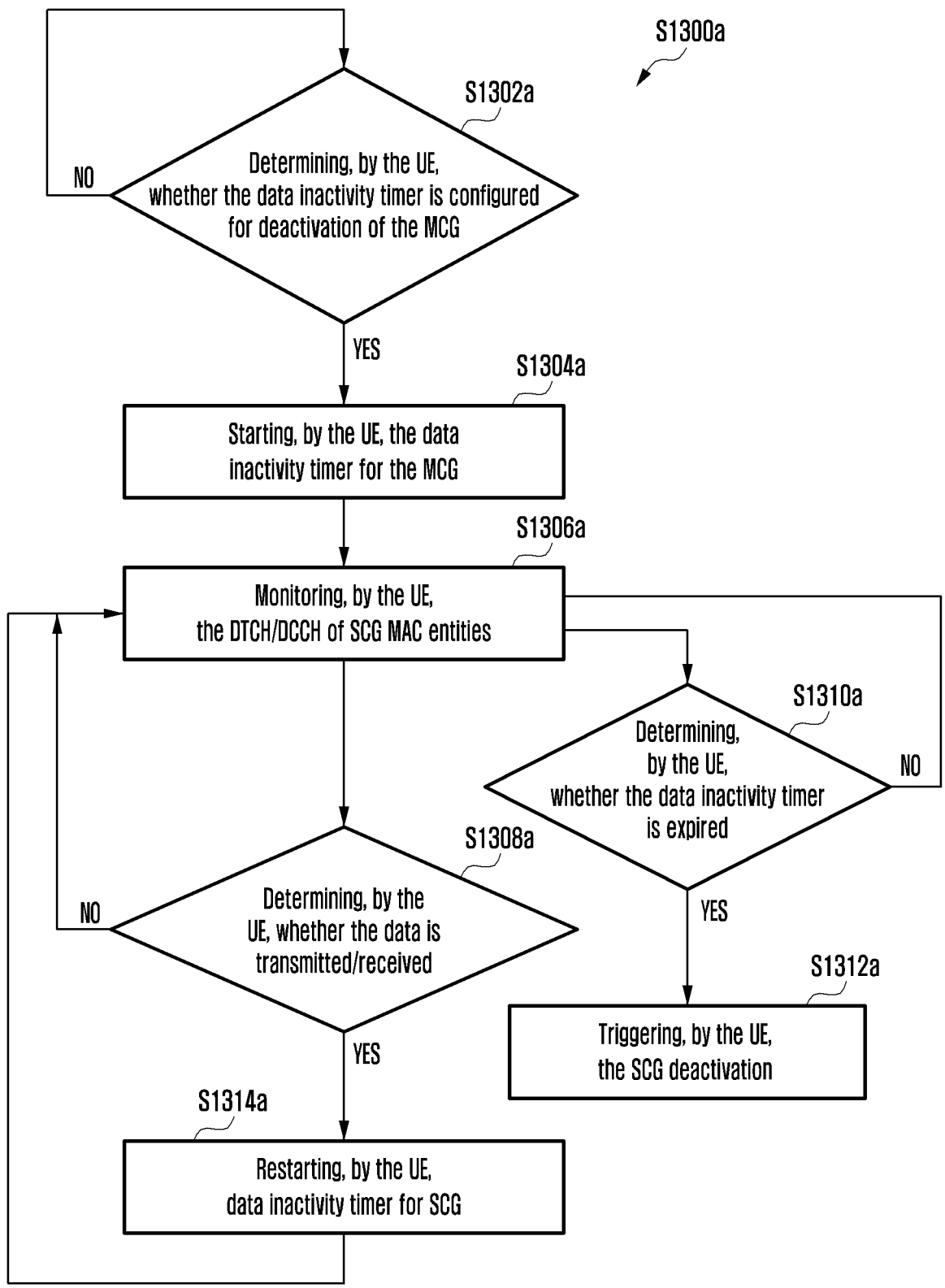
FIG. 13A is another example flow chart illustrating a method, implemented by a UE, for triggering an SCG deactivation based on a data inactivity timer, according to an embodiment of the disclosure.

FIG. 13A is another example flow chart illustrating a method, implemented by a UE, for triggering a SCG deactivation based on a data inactivity timer, according to an embodiment of the disclosure.

Referring to FIG. 13A, consider a proposed method, if SCG deactivation is up to the UE implementation, below approaches can be used for the trigger of SCG deactivation. Once deactivated, UE (100) may use an activate prohibit timer (configurable) to avoid immediate activation or ping pong between deactivation and activation.
Data Inactivity Timer The dataInactivityTimer defined in specification is applicable only for MCG. Once the timer is expired, RRC will release the connection locally.

If NW configures dataInactivityTimer, UE (100) may use this data inactivity timer for SCG as well.

It may start using the data inactivity timer for SCG upon the activation of SCG

If any of the MAC entities in SCG transmits or receives a MAC SDU on DTCH/DCCH logical channel, start or restart the dataInactivityTimer When dataInactivityTimer is expired, SCG MAC should indicate the same to RRC SCG deactivation procedure should be initiated upon dataInactivityTimer expiry Referring to FIG. 13A, in a method S1300a, the operations S1302a-S1314a are performed by the SCG deactivation-reactivation controller (140). At operation S1302a, the method includes determining whether the data inactivity timer is configured for deactivation of the MCG. If the data inactivity timer is not configured for deactivation of the MCG then, the method again performs the operation S1302a. If the data inactivity timer is configured for the deactivation of the MCG then, at operation S1304a, the method includes starting the data inactivity timer for the MCG. At operation S1306a, the method includes monitoring the DTCH/DCCH of CCG MAC entities. At operation S1308a, the method includes determining whether the data is transmitted/received at the UE (100). If the data is transmitted/received at the UE (100) then, at operation S1314a, the method includes restarting the data inactivity timer for the SCG. If the data is not transmitted/received at the UE (100) then, the method again performs the operation S1306a. At operation S1310a, the method includes determining whether the data inactivity timer is expired. If the data inactivity timer is not expired then, at operation S1306a, the method includes monitoring the DTCH/DCCH of CCG MAC entities. If the data inactivity timer is expired then, at operation S1312a, the method includes triggering the SCG deactivation.

Figure 13B:
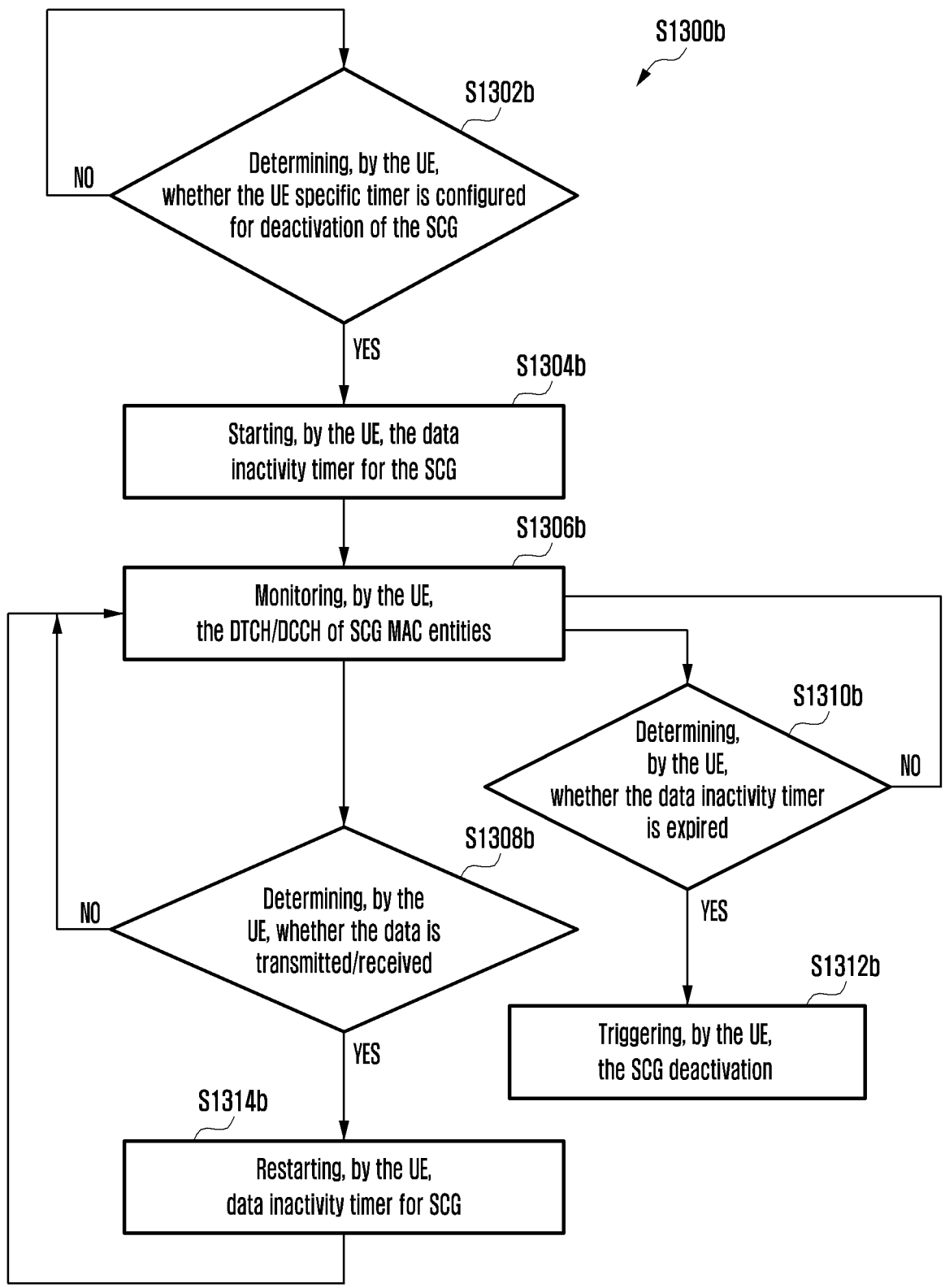
FIG. 13B is another example flow chart illustrating a method, implemented by a UE, for triggering an SCG deactivation based on a T3xy timer, according to an embodiment of the disclosure.

FIG. 13B is another example flow chart illustrating a method, implemented by a UE, for triggering an SCG deactivation based on a T3xy timer, according to an embodiment of the disclosure.

Referring to FIG. 13B, consider a proposed method, the UE specific timer is having followings specifications—

The UE (100) may use an internal timer to trigger the deactivation of SCG

This timer may be implementation specific

If any of the MAC entities in SCG transmits or receives a MAC SDU on DTCH/DCCH logical channel, start or restart this internal timer When the timer is expired, SCG MAC should indicate the same to RRC SCG deactivation procedure should be initiated upon timer expiry As shown in the FIG. 13B, in a method S1300c, the operations S1302b-S1314b are performed by the SCG deactivation-reactivation controller (140). At operation S1302b, the method includes determining whether the T3xy timer is configured for deactivation of the SCG. If the T3xy timer is not configured for deactivation of the SCG then, the method again performs the operation S1302b. If the T3xy timer is configured for the deactivation of the SCG then, at operation S1304b, the method includes starting the T3xy timer for the SCG. At operation S1306b, the method includes monitoring the DTCH/DCCH of CCG MAC entities. At operation S1308b, the method includes determining whether the data is transmitted/received at the UE (100). If the data is transmitted/received at the UE (100) then, at operation S1314a, the method includes restarting the T3xy timer for the SCG. If the data is not transmitted/received at the UE (100) then, the method again performs the operation S1306b. At operation S1310b, the method includes determining whether the T3xy timer is expired. If the T3xy timer is not expired then, at operation S1306b, the method includes monitoring the DTCH/DCCH of CCG MAC entities. If the T3xy timer is expired then, at operation S1312b, the method includes triggering the SCG deactivation.

Figure 13C:
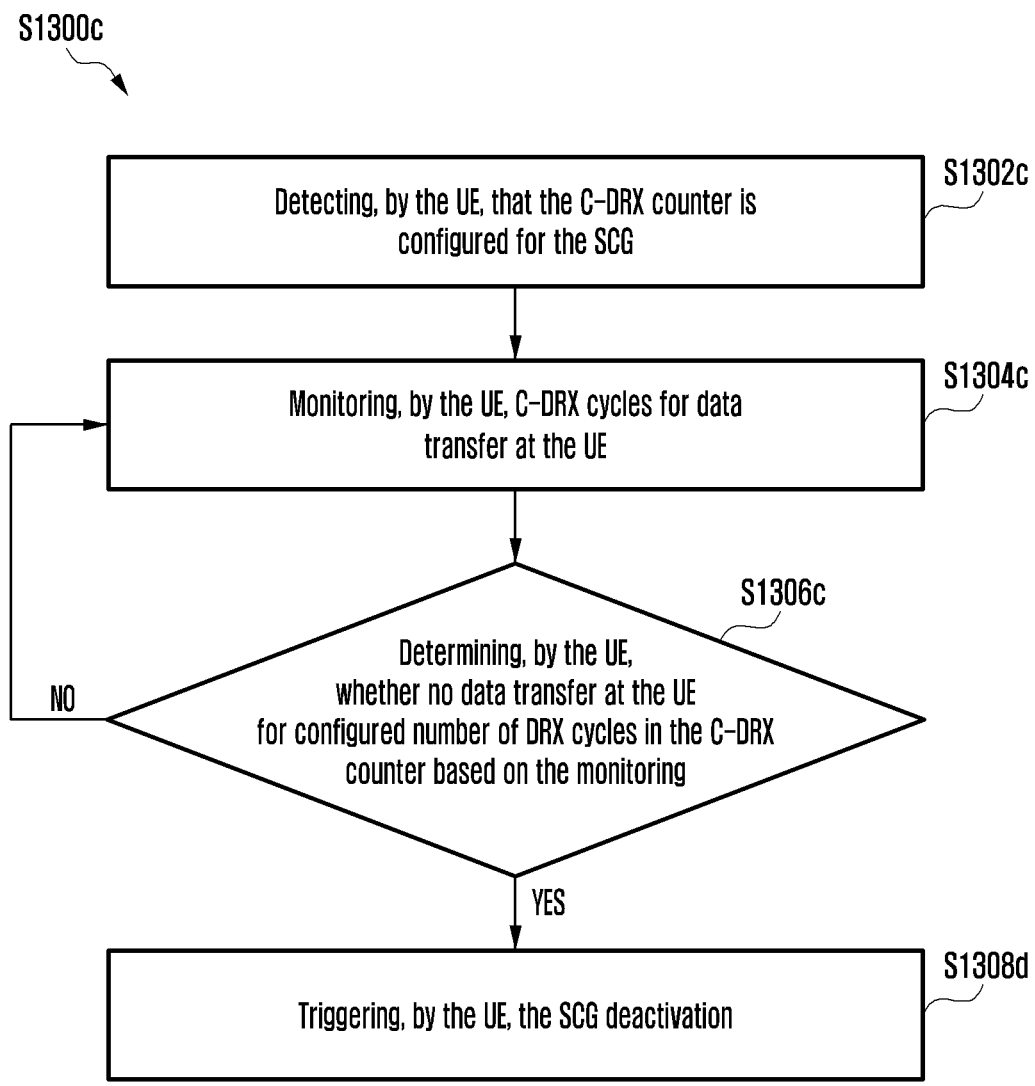
FIG. 13C is another example flow chart illustrating a method, implemented by a UE, for triggering an SCG deactivation based on a C-DRX counter, according to an embodiment of the disclosure.

FIG. 13C is another example flow chart illustrating a method, implemented by a UE, for triggering an SCG deactivation based on a C-DRX counter, according to an embodiment of the disclosure.

Referring to FIG. 13C, consider a proposed method, uses of CDRX configuration for SCG are as follows—

If network (1000) configures CDRX for SCG, the UE (100) may use this to trigger the SCG deactivation as well.

UE monitors the on duration in CDRX cycles for any data transfer

If there is no data transmitted or received in any of the SCG MAC entities, for 'n' DRX-cycles, indicate the same to RRC RRC may initiate the SCG deactivation upon this indication received from SCG MAC 'n' may be configured by the UE (100) and can be implementation specific Referring to FIG. 13C, in operation S1300c, the operations S1302c-S1308c are performed by the SCG deactivation-reactivation controller (140). At operation S1302c, the method includes detecting that the C-DRX counter derived from the CDRX configuration is for deactivation of the SCG. At operation S1304c, the method includes monitoring the C-DRX cycles for data transfer at the UE (100). At operation S1306c, the method includes determining whether no data transfer at the UE (100) for configured number of DRX cycles in the C-DRX counter based on the monitoring. If no data transfer at the UE (100) for configured number of DRX cycles in the C-DRX counter then, at operation S1308c, the method includes triggering the SCG deactivation. If data is transferred at the UE (100) for configured number of DRX cycles in the C-DRX counter then, at operation S1304c, the method includes monitoring the C-DRX cycles for data transfer at the UE (100).

Figure 14:
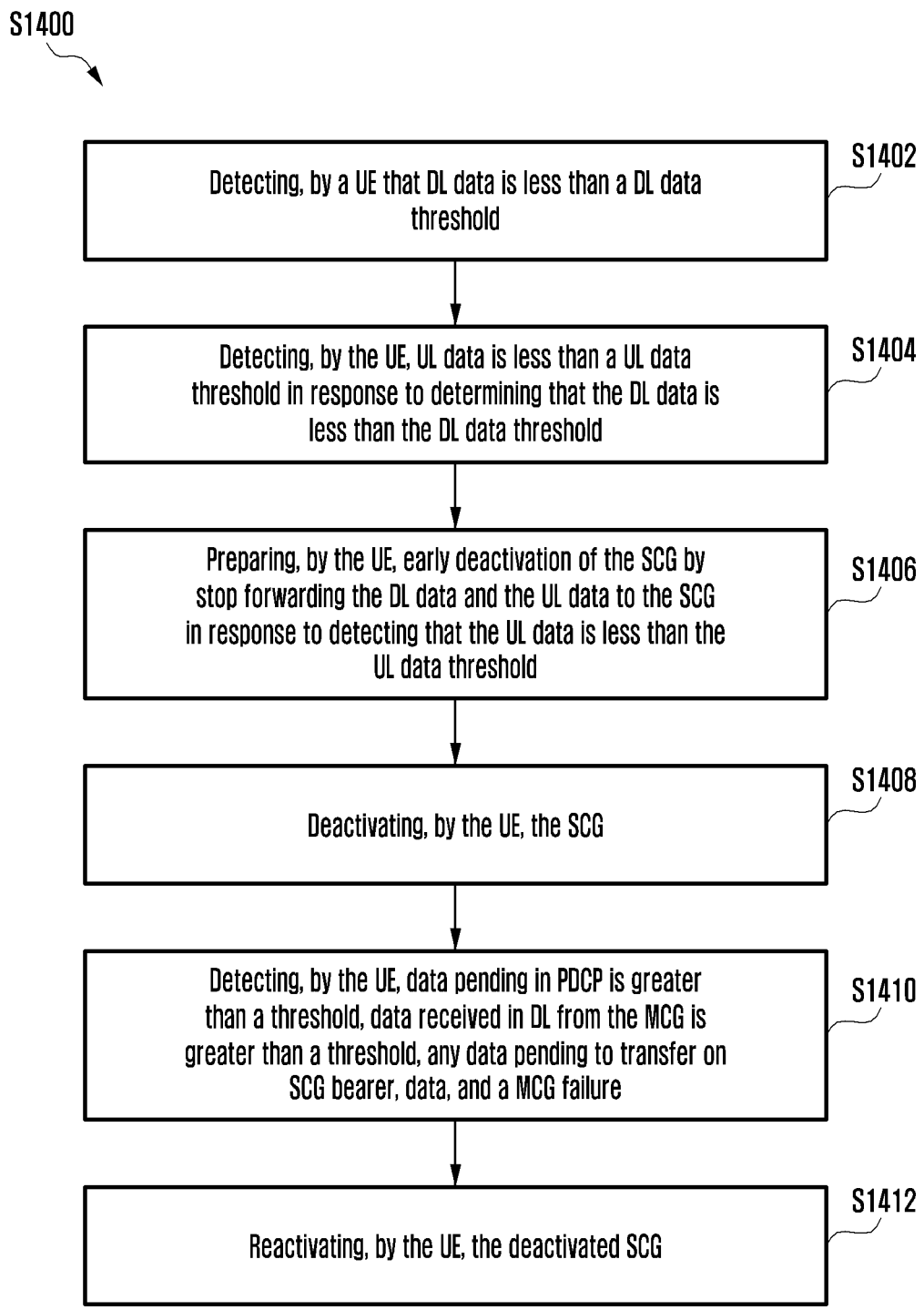
FIG. 14 is an example flow chart illustrating a method, implemented by a UE, reactivating a deactivated SCG, according to an embodiment of the disclosure.

FIG. 14 is an example flow chart illustrating a method, implemented by a UE, reactivating a deactivated SCG, according to an embodiment of the disclosure.

Referring to FIG. 14, in a method S1400, the operations S1402-S1412 are performed by the SCG deactivation-reactivation controller (140). At operation S1402, the method includes detecting that the DL data is less than the DL data threshold. At operation S1404, the method includes detecting the UL data is less than the UL data threshold in response to determining that the DL data is less than the DL data threshold. At operation S1406, the method includes preparing the early deactivation of the SCG by stop forwarding the DL data and the UL data to the SCG in response to detecting that the UL data is less than the UL data threshold. At operation S1408, the method includes deactivating the SCG. At operation S1410, the method includes detecting the data pending in PDCP is greater than a threshold, data received in DL from the MCG is greater than a threshold, any data pending to transfer on SCG bearer, data, and an MCG failure. At operation S1412, the method includes reactivating the deactivated SCG.

Figure 15:
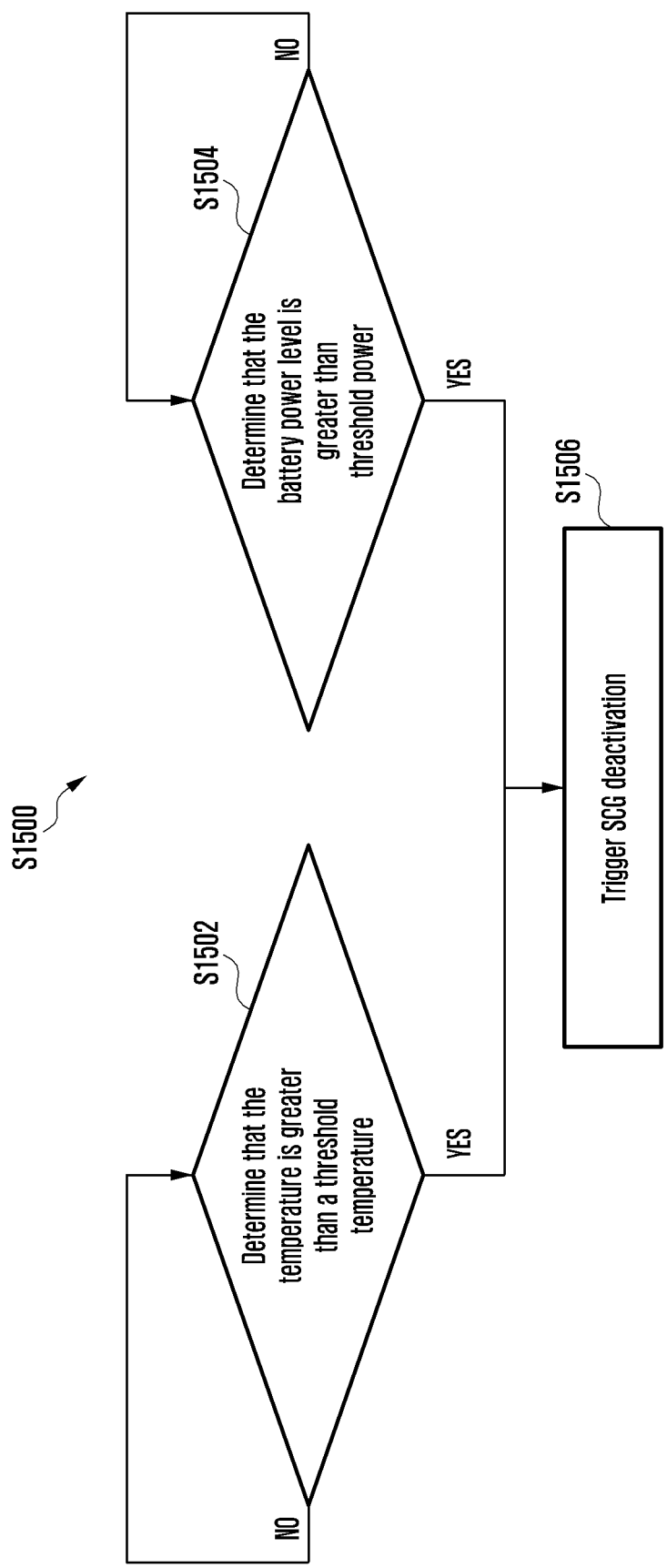
FIG. 15 is an example flow chart illustrating a method, implemented by a UE, triggering an SCG deactivation based on a temperature level and a battery power, according to an embodiment of the disclosure.

FIG. 15 is an example flow chart illustrating a method, implemented by a UE, triggering an SCG deactivation based on a temperature level and a battery power, according to an embodiment of the disclosure.

Referring to FIG. 15, consider a proposed method, battery and temperature specifications are as follows—

When SCG is activated, it is normal that the device will consume more power and the temperature of the device may be high.

If the battery level is low (below a threshold) or if the temperature of the device is high (above a threshold), it is better to deactivate SCG This is to save from more power consumption and to maintain or reduce the temperature.

If the battery level of the UE (100) is below a certain threshold level, UE may choose to deactivate SCG If the temperature level of the UE (100) is above a certain threshold level, UE may choose to deactivate SCG As shown in the FIG. 15, in a method S1500, at operation S1502, the method includes determining whether the temperature is greater than the threshold temperature. If the temperature is not greater than the threshold temperature then, the method again performs the operation of the S1502. At operation S1504, the method includes determining whether the battery power level is greater than the threshold power. If the battery power level is not greater than the threshold power then, the method again performs the operation of the S1504. If the temperature is greater than the threshold temperature then, at the method S1506, the method includes triggering the SCG deactivation. If the battery power level is not greater than the threshold power then, at the method S1506, the method includes triggering the SCG deactivation.

Figure 16:
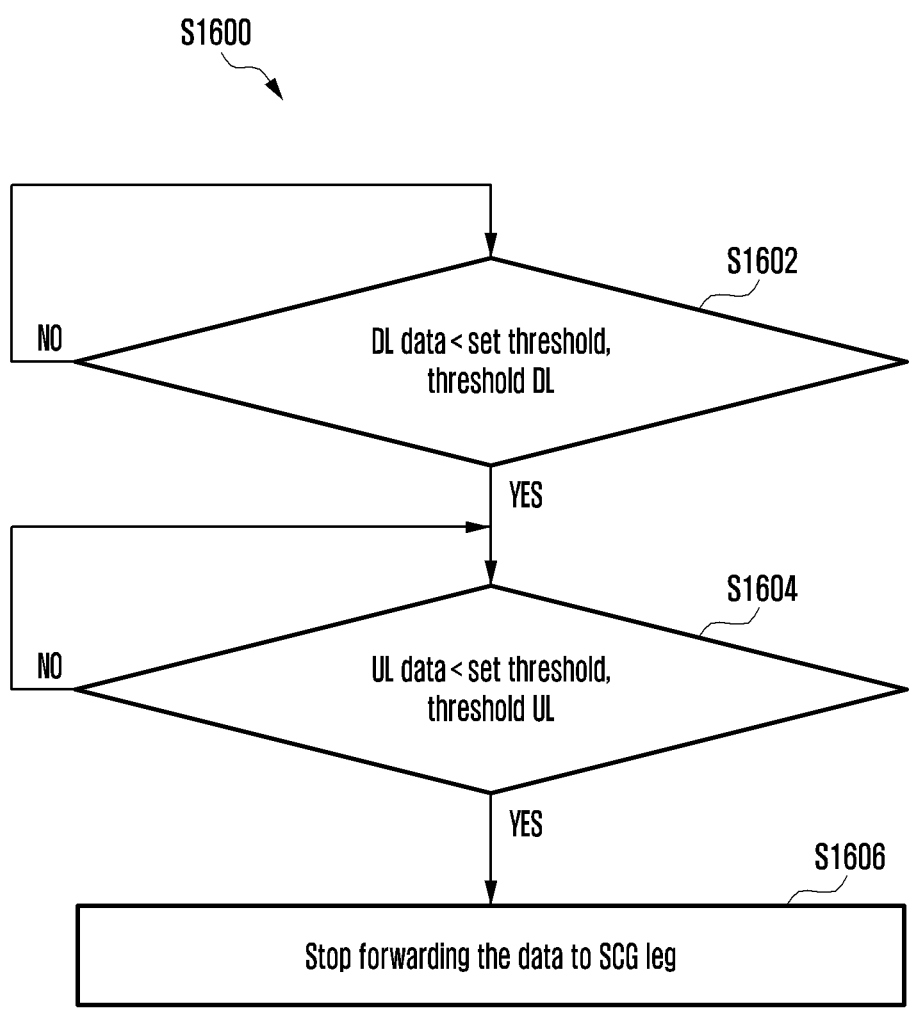
FIG. 16 is an example flow chart illustrating a method, implemented by a UE, for stop forwarding data to a SCG leg based on DL data and UL data, according to an embodiment of the disclosure.

FIG. 16 is an example flow chart illustrating a method, implemented by a UE, for stop forwarding data to an SCG leg based on DL data and UL data, according to an embodiment of the disclosure.

Referring to FIG. 16, consider a proposed method, followings methods to support early SCG deactivation—

It is possible that the SCG may remain active for long due to small chunks of data (sometimes due to periodic synchronization of applications).

To avoid this and to aid early deactivation, the UE (100) can control the data over SCG.

If the amount of actual user data in DL is 0 or less than a certain threshold and if the amount of user data in UL is below a threshold, the UE (100) may stop forwarding the UL packets to SCG leg and can aid the deactivation of SCG faster.

Figure 17:
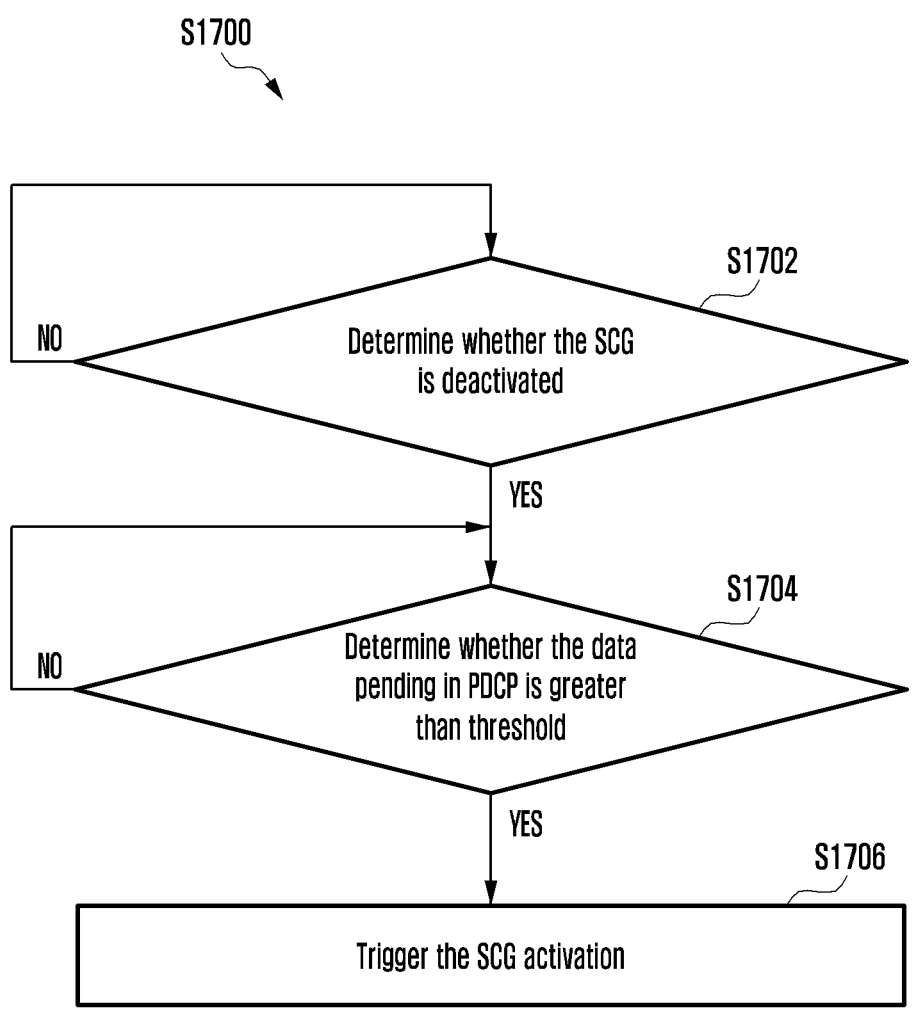
FIG. 17 is an example flow chart illustrating a method, implemented by a UE, triggering an SCG deactivation based on data pending in a PDCP greater than a threshold, according to an embodiment of the disclosure.

Referring to FIG. 17, consider a proposed method, if SCG activation is up to UE implementation, below approaches can be used for the trigger of SCG activation. Once activated, the UE (100) may use a deactivate prohibit timer (configurable) to avoid immediate deactivation or ping pong between activation and deactivation.

Pending Data in Uplink (UL)

If the SCG is deactivated and the amount of data pending at PDCP is above a threshold, the UE (100) may activate the SCG, and This threshold may be same as the UL split threshold configured by the network node (200) or may be any other decided value by the device and can be implementation specific Data in Downlink (DL)

If the amount of data received in MCG in DL is more than a set threshold, the UE (100) may trigger the activation of SCG, and This threshold may be decided by the device and can be implementation specific.

Threshold value mentioned in UL and DL scenarios are allowed to be different.

Figure 18:
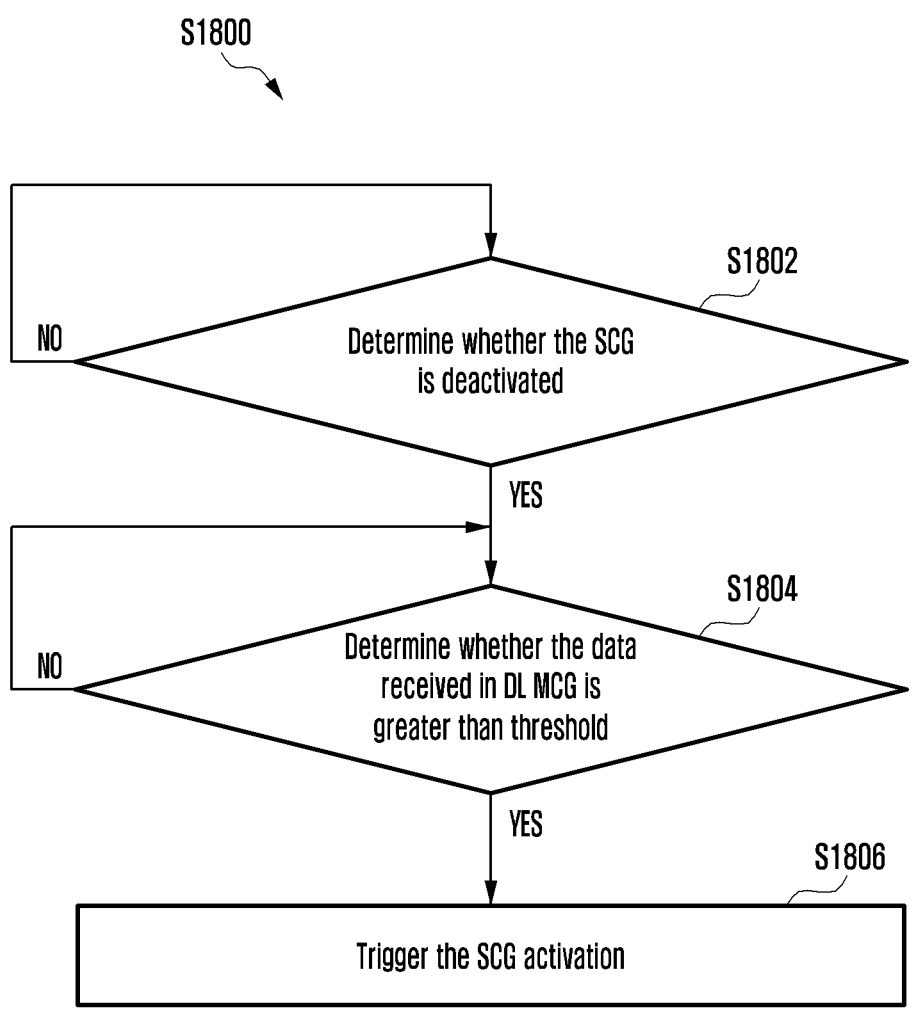
FIG. 18 is an example flow chart illustrating a method, implemented by a UE, triggering an SCG activation based on a data received in a DL MCG greater than a threshold, according to an embodiment of the disclosure.

Referring to FIG. 18, consider a proposed method, upon detection of MCG failure, the UE (100) may activate the SCG to trigger the MCG Failure information. Further, if the battery level is above a certain threshold, the UE (100) may choose to activate the SCG and if the temperature level is below a certain threshold, the UE (100) may choose to activate the SCG.

Referring to FIG. 16, in operation S1600, the operations S1602-S1606) are performed by the SCG deactivation-reactivation controller (140). As shown in the FIG. 16, at operation S1602, the method includes determining whether the DL data is less than the DL data threshold. If the DL data is not less than the DL data threshold then, the method again performs the operations S1602. If the DL data is less than the DL data threshold then, at operation S1604, the method includes determining the UL data is less than the UL data threshold. If the UL data is less than the UL data threshold at operation S1606, the method includes stop forwarding the data to the SCG leg.

FIG. 17 is an example flow chart illustrating a method, implemented by a UE, triggering an SCG deactivation based on a data pending in PDCP greater than a threshold, according to an embodiment of the disclosure.

Referring to FIG. 17, in an operation S1700, the operations S1702-S1706 are performed by the SCG deactivation-reactivation controller (140). At operation S1702, the method includes determining whether the SCG is deactivated. If the SCG is not deactivated then, the method performs the operations S1702. If the SCG is deactivated then, at operation S1704, the method includes determining whether the data pending in the PDCP is greater than the threshold. If the data pending in the PDCP is not greater than the threshold then, the method performs the operations S1704. If the data pending in the PDCP is greater than the threshold then, at operation S1706, the method includes triggering the SCG activation.

FIG. 18 is an example flow chart illustrating a method, implemented by a UE, triggering an SCG activation based on a data received in a DL MCG greater than a threshold, according to an embodiment of the disclosure. The operations S1802-S1806 are performed by the SCG deactivation-reactivation controller (140).

Referring to FIG. 18, in a method S1700, at operation S1802, the method includes determining whether the SCG is deactivated. If the SCG is not deactivated then, the method performs the operations S1802. If the SCG is deactivated then, at operation S1804, the method includes determining whether the data received in the DL MCG is greater than the threshold. If the data received in the DL MCG is greater than the threshold then, at operation S1806, the method includes triggering the SCG activation. If the data received in the DL MCG is not greater than the threshold then, the method again performs the operations S1804.

Figure 19:
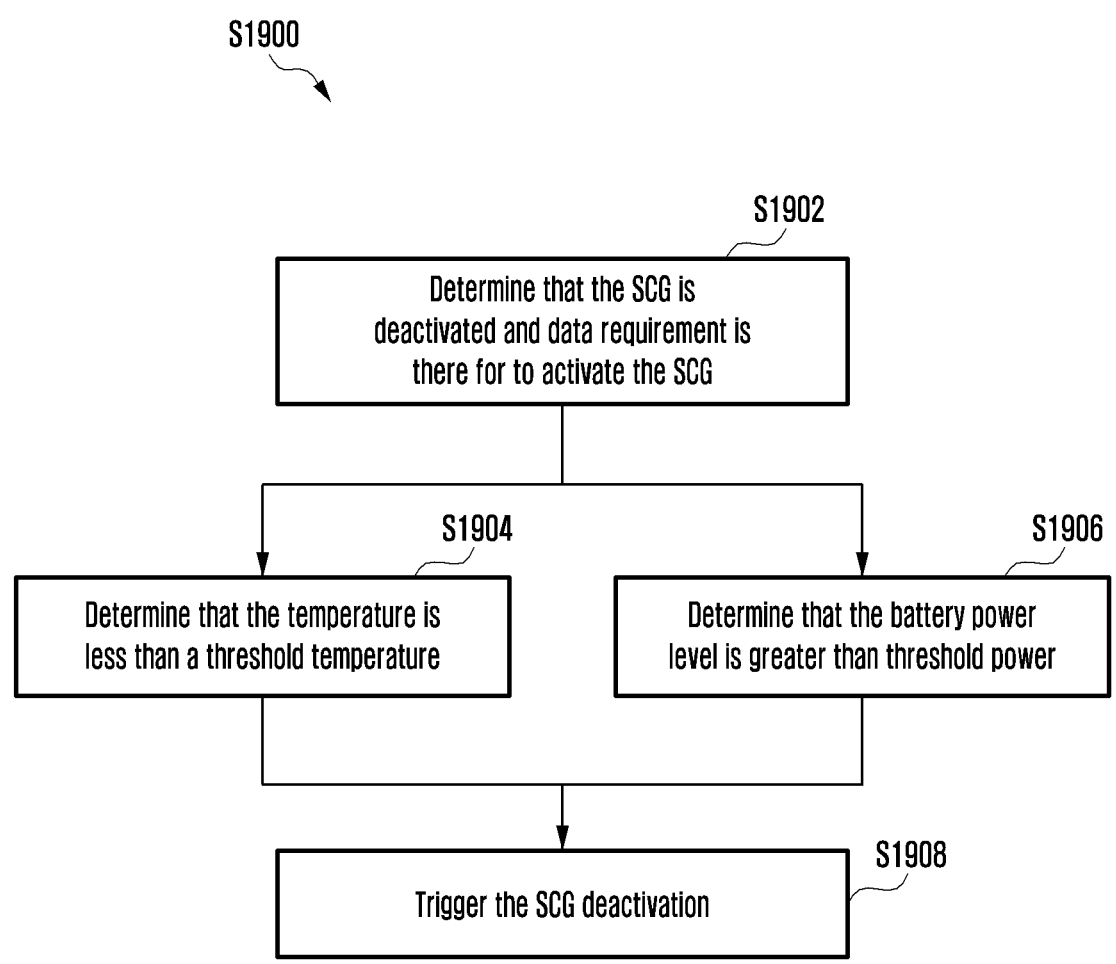
FIG. 19 is another example flow chart illustrating a method, implemented by a UE, triggering an SCG deactivation based on a temperature level and a battery power, according to an embodiment of the disclosure.

FIG. 19 is another example flow chart illustrating a method, implemented by a UE, triggering a SCG deactivation based on a temperature level and a battery power, according to an embodiment of the disclosure.

The operations S1902-S1908 are performed by the SCG deactivation-reactivation controller (140).

Referring to FIG. 19, in a method S1900, at operation S1902, the method includes determining that the SCG is deactivated and data requirement is there for to activate the SCG. At operation S1904, the method includes determining that the temperature is less than the threshold temperature. At operation S1906, the method includes determining that the battery power level is greater than threshold power. At operation S1908, the method includes trigger the SCG deactivation.

The various actions, acts, blocks, operations, or the like in the flow charts S400-S700d and S1300a-S1900 may be performed in the order presented, in a different order or simultaneously. Further, in some embodiments, some of the actions, acts, blocks, operations, or the like may be omitted, added, modified, skipped, or the like without departing from the scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

We claim:

1. A method performed by a user equipment (UE) for controlling a secondary cell group (SCG) in a multi-radio access technology (multi-RAT) dual connectivity (MR-DC) network, the method comprising:
   detecting that a connected mode-discontinuous reception (C-DRX) counter is configured for an automatic deactivation of the SCG;
   detecting an activation of the SCG;
   monitoring C-DRX cycles for transmitting or receiving of data;
   determining whether the data is transmitted or received for a configured number of DRX cycles in the C-DRX counter based on the monitoring; and
   deactivating the SCG in case that the data is not transmitted or received for the configured number of DRX cycles in the C-DRX counter.

2. The method of claim 1, further comprising:
   detecting at least one of a data inactivity timer configured for a master cell group (MCG) or a UE specific timer;
   starting at least one of the data inactivity timer configured for the MCG to use for the automatic deactivation of the SCG, or the UE specific timer to use for the automatic deactivation of the SCG;
   detecting whether at least one of the data inactivity timer configured for the MCG, or the UE specific timer is expired; and
   deactivating the SCG based on the expiry of at least one of the data inactivity timer configured for the MCG, or the UE specific timer.

3. The method of claim 2, further comprising:
   monitoring whether there is a data activity until the expiry of at least one of the data inactivity timer or the UE specific timer.

4. The method of claim 3, further comprising:
   restarting at least one of the data inactivity timer or the UE specific timer in response to determining that there is data activity at the UE before expiry of at least one of the data inactivity timer or the UE specific timer; and
   monitoring whether there is a data activity at the UE until expiry of at least one of the restarted data inactivity timer or the restarted UE specific timer.

5. The method of claim 1, wherein deactivating the SCG comprises:
   delivering, by a medium access control (MAC) entity of the UE, an indication to a radio resource control (RRC) entity of the UE for automatic deactivation of the SCG by the UE; and
   deactivating, by the RRC entity of the UE, the SCG without releasing an RRC connection between the UE and a network node.

6. The method of claim 1, further comprising:
   detecting at least one of data pending in packet data convergence protocol (PDCP) is greater than a threshold, data received in downlink (DL) from a master cell group (MCG) is greater than a threshold, any data pending to transfer on SCG bearer, or an MCG failure; and
   reactivating the deactivated SCG.

7. The method of claim 1, wherein deactivating the SCG comprises:
   detecting whether downlink (DL) data is less than a DL data threshold;
   detecting uplink (UL) data is less than a UL data threshold in response to determining that the DL data is less than the DL data threshold;
   preparing early deactivation of the SCG by stop forwarding the DL data and the UL data to the SCG in response to detecting that the UL data is less than the UL data threshold; and
   deactivating the SCG.

8. The method of claim 7, further comprising:
   detecting at least one of data pending in packet data convergence protocol (PDCP) is greater than a threshold, data received from a master cell group (MCG) is greater than a threshold, any data pending to transfer on SCG bearer, data, or an MCG failure; and
   reactivating the deactivated SCG.

9. The method of claim 1, further comprising reactivating the deactivated SCG in case that a battery level is above a threshold battery power.

10. The method of claim 1, further comprising reactivating the deactivated SCG in case that a temperature level is below a threshold temperature.

11. A user equipment (UE) for controlling a secondary cell group (SCG) in a multi-radio access technology (multi-RAT) dual connectivity (MR-DC) network, the UE comprising:
    a transceiver; and
    at least one processor coupled with the transceiver and configured to:
      detect that a connected mode-discontinuous reception (C-DRX) counter is configured for an automatic deactivation of the SCG,
      detect an activation of the SCG,
      monitor C-DRX cycles for transmitting or receiving of data,
      determine whether the data is transmitted or received for a configured number of DRX cycles in the C-DRX counter based on the monitoring, and
      deactivate the SCG in case that the data is not transmitted or received for the configured number of DRX cycles in the C-DRX counter.

12. The UE of claim 11, wherein the at least one processor is further configured to:
    detect at least one of a data inactivity timer configured for a master cell group (MCG) or a UE specific timer,
    start at least one of the data inactivity timer configured for the MCG to use for the automatic deactivation of the SCG, or the UE specific timer to use for the automatic deactivation of the SCG,
    detect whether at least one of the data inactivity timer configured for the MCG, or the UE specific timer is expired, and
    deactivate the SCG based on the expiry of at least one of the data inactivity timer configured for the MCG, or the UE specific timer.

13. The UE of claim 12, wherein the at least one processor is further configured to:
    monitor whether there is a data activity until the expiry of at least one of the restarted data inactivity timer or the UE specific timer.

14. The UE of claim 13, wherein the at least one processor is further configured to:
    restart at least one of the data inactivity timer or the UE specific timer in response to determining that there is data activity at the UE before expiry of at least one of the data inactivity timer or the UE specific timer, and monitor whether there is a data activity at the UE until expiry of at least one of the restarted data inactivity timer or the restarted UE specific timer.

15. The UE of claim 11, wherein, to deactivate the SCG, the at least one processor is configured to:
deliver, by a medium access control (MAC) entity of the UE, an indication to a radio resource control (RRC) entity of the UE for automatic deactivation of the SCG by the UE, and
deactivate, by the RRC entity of the UE, the SCG without releasing an RRC connection between the UE and a network node.

16. The UE of claim 11, the at least one processor is further configured to:
detect at least one of data pending in packet data convergence protocol (PDCP) is greater than a threshold, data received in downlink (DL) from a master cell group (MCG) is greater than a threshold, any data pending to transfer on SCG bearer, or an MCG failure, and
reactivate the deactivated SCG.

17. The UE of claim 11, wherein, to deactivate the SCG, the at least one processor is further configured to:
detect whether downlink (DL) data is less than a DL data threshold,
detect uplink (UL) data is less than a UL data threshold in response to determining that the DL data is less than the DL data threshold,
prepare early deactivation of the SCG by stop forwarding the DL data and the UL data to the SCG in response to detecting that the UL data is less than the UL data threshold, and
deactivate the SCG.

18. The UE of claim 17, wherein the at least one processor is further configured to:
detect at least one of data pending in packet data convergence protocol (PDCP) is greater than a threshold, data received from a master cell group (MCG) is greater than a threshold, any data pending to transfer on SCG bearer, data, or an MCG failure, and
reactivate the deactivated SCG.

19. The UE of claim 11, wherein the at least one processor is further configured to reactivate the deactivated SCG in case that a battery level is above a threshold battery power.

20. The UE of claim 11, wherein the at least one processor is further configured to reactivate the deactivated SCG in case that a temperature level is below a threshold temperature.

* * * * *